US009656492B2

(12) United States Patent
Leynadier et al.

(10) Patent No.: US 9,656,492 B2
(45) Date of Patent: May 23, 2017

(54) METHOD FOR GENERATING PRINTS ON A FLATBED PRINTER, APPARATUS THEREFOR AND A COMPUTER PROGRAM THEREFOR

(71) Applicant: OCE-TECHNOLOGIES B.V., Venlo (NL)

(72) Inventors: Christophe Antoine Leynadier, Maison Alfort (FR); Maria V. Ortiz Segovia, Paris (FR); Jérôme O. R. Guermont, Gentilly (FR); Arlette Del Aguila, Créteil (FR); Martinus G. M. Lange, Nuland (NL); Catherine M. H. A. Le Maitre, Antony (FR)

(73) Assignee: OCE-TECHNOLOGIES B.V., Venlo (NL)

(*) Notice: Subject to any disclaimer, the term of this patent is extended or adjusted under 35 U.S.C. 154(b) by 0 days.

(21) Appl. No.: 14/981,095

(22) Filed: Dec. 28, 2015

(65) Prior Publication Data
US 2016/0107468 A1    Apr. 21, 2016

Related U.S. Application Data

(63) Continuation of application No. PCT/EP2014/063327, filed on Jun. 25, 2014.

(30) Foreign Application Priority Data

Jun. 26, 2013 (EP) ..................................... 13305889
Jul. 9, 2013 (EP) ..................................... 13305979

(51) Int. Cl.
B41J 29/393 (2006.01)
B41J 29/38 (2006.01)
(Continued)

(52) U.S. Cl.
CPC ................ B41J 29/38 (2013.01); B41J 3/28 (2013.01); B41J 11/008 (2013.01);
(Continued)

(58) Field of Classification Search
CPC .. B41J 11/0095; B41J 11/009; B41J 2/14153; B41J 11/008; B41J 11/42; B41J 2/04505;
(Continued)

(56) References Cited

U.S. PATENT DOCUMENTS 9,033,447 B2 * 5/2015 Morita ..................... B41J 3/407
347/16
2006/0221403 A1 10/2006 Bancel
(Continued)

FOREIGN PATENT DOCUMENTS

EP    2433716 A1    3/2012
EP    2508347 A1    10/2012
JP    9-156163 A    6/1997

*Primary Examiner* — Lamson Nguyen
(74) *Attorney, Agent, or Firm* — Birch, Stewart, Kolasch & Birch, LLP

(57) ABSTRACT

A flatbed printer and a method for printing with a flatbed printer are disclosed. The flatbed printer includes a flatbed surface for placing media to be printed upon, a controller configured to control the printing of digital images on the media, a camera-projector system connected to the controller and situated above the flatbed surface, and a print head for ejecting recording material on the media. The method includes detecting an arbitrary position, an arbitrary shape, an arbitrary size and/or an arbitrary thickness of a media on the flatbed surface with a camera of the camera-projector system, projecting a digital image on the media with a projector of the camera-projector system, and printing the digital image on the media according to the projection by moving the print head over the flatbed surface.

13 Claims, 16 Drawing Sheets

(51) Int. Cl.
*H04N 1/00* (2006.01)
*B41J 3/28* (2006.01)
*B41J 11/00* (2006.01)

(52) U.S. Cl.
CPC ........ *B41J 11/0035* (2013.01); *B41J 11/0085* (2013.01); *H04N 1/00127* (2013.01); *H04N 1/00251* (2013.01)

(58) Field of Classification Search
CPC ........ B41J 2/04541; B41J 2/0458; B41J 3/28; B41J 11/06; B41J 2/04508; B41J 2/04558; B41J 2/07; B41J 3/407; B41J 3/4073; B41J 11/007
See application file for complete search history.

(56) References Cited

U.S. PATENT DOCUMENTS

2009/0252437 A1 10/2009 Li et al.
2012/0256995 A1 10/2012 Holzer et al.

\* cited by examiner

METHOD FOR GENERATING PRINTS ON A FLATBED PRINTER, APPARATUS THEREFOR AND A COMPUTER PROGRAM THEREFOR

CROSS-REFERENCE TO RELATED APPLICATIONS

This application is a Continuation of International Application No. PCT/EP2014/063327, filed on Jun. 25, 2014, and for which priority is claimed under 35 U.S.C. §120. PCT/EP2014/063327 claims priority under 35 U.S.C. §119(a) to Application Nos. 13305889.1 and 13305979.0, filed in Europe on Jun. 26, 2013 and Jul. 9, 2013, respectively. The entire contents of each of the above-identified applications are hereby incorporated by reference into the present application.

BACKGROUND OF THE PRESENT INVENTION

1. Field of the Invention

The present invention relates to a method for printing with a flatbed printer comprising a flatbed surface for placing a piece of media to be printed upon, a controller configured to control the printing of digital images on the piece of media, and a print head for ejecting recording material on the piece of media.

The present invention also relates to a flatbed printer comprising a flatbed surface for placing media to be printed upon, a controller configured to control the printing of digital images, and a print head for ejecting recording material on the media, the print head being movable over the flatbed surface.

The present invention further relates to a computer program product, including computer readable code embodied on a non-transitory computer readable medium, said computer readable code comprising instructions for generating a print according to the method of the present invention, and to a flatbed printer configured to generate prints according to the method of the present invention.

The print head of the flatbed printer may be mounted on a gantry above the flatbed surface. In case of a gantry, the gantry may be moving over the flatbed surface in a first direction, while the print head is movable along the gantry in a second direction perpendicular to the first direction. In case of a print head having a same width as the flatbed surface, the print head may be moving in one direction over the flatbed surface. The controller is connected to the print head for controlling the print head. The controller is also configured to control the movement of the print head over the flatbed surface. The distance from the print head to the flatbed surface may be variable in order to allow the printing of 3D images.

The recording material may be a hot melt ink or a UV curable ink. When the latter ink is used, the print head is also provided with UV lamps for curing the recording material when ejected on the piece of media placed on the flatbed surface. The flatbed surface usually has the form of a rectangle, for example of a width of 1.22 m and a length of 1.22 m, or of a width of 1.22 m and a length of 2.44 m.

A piece of media with dimensions smaller or equal to the dimensions of the flatbed surface can be placed on the flatbed surface. Even a piece of media with dimensions larger than the dimensions of the flatbed surface can be placed on the flatbed surface. However, a large piece of media has to be moved to completely print the large piece of media.

Flatbed print systems usually apply recording material, like colorants, on a piece of media placed on the flatbed in the form of toner or ink, wherein the ink may be hot melt ink or UV curable ink, according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes color management to convert color values of the pixels in the digital image into composition values related to the printer color space as is set up by the colorants of the print system. Depending on the intended print quality and the characteristics of the print process, the pixels of the pattern may be printed in more than one pass, wherein a position of the piece of media on the flatbed has an opportunity to receive a colorant in one or more of the passes of the print head across the flatbed.

2. Description of Background Art

An operator may place pieces of media on the flatbed surface in order to print images on the pieces of media according to digital images, which have been offered to the controller. Positioning of a piece of media must be done very accurately with respect to its orientation. The operator usually measures right-angled distances of the piece of media from the edges of the flatbed surface with a measuring tool like a measuring cord, a tape-measure or a ruler. Another method to position the media is to align the piece of media with reference rules, which have been printed on the flatbed table beforehand. The operator enters the measured distances with an application running on a computer connected to the controller of the flatbed printer or on the controller itself. After entering the distances, the operator selects the digital image to be printed on the piece of media and starts the printing of the flatbed printer. Therefore, the controller or the computer is provided with a user interface suitable for data entry in general. Resuming, the operator has to execute different manual steps. Each step may lead to operator errors before printing the digital image on the piece of media.

SUMMARY OF THE PRESENT INVENTION

It is an object of the present invention to achieve a decrease of operator errors at the flatbed printer when creating images on a piece of media placed on the flatbed surface.

According to the present invention, this object is achieved by a method according to the present invention, wherein the flatbed printer comprises a camera system connected to the controller, the camera system having a reach of at least an entire flatbed surface, the method comprising the steps of detecting the piece of media on the flatbed surface with the camera system, deriving a position and a size of the detected piece of media on the flatbed surface and printing the digital image on the detected piece of media by moving the print head over the flatbed surface and ejecting the recording material on the detected piece of media.

The camera system may be wired or wirelessly connected to the control system. The camera system may be for example a photo-camera or a mobile phone comprising a camera. The camera system takes pictures of the flatbed surface comprising the piece of media from such a view-point that characteristics of the piece of media like its size and shape are easy derivable from the image of the picture by image processing software residing in the controller of the printing system. Since the size of the flatbed surface is known to the controller of the printing system and at least part of the boundaries of the flatbed surface is also present on the image of the picture, the size of the piece of media and its position on the flatbed surface is derivable from the image of the picture. A reach of the camera system is at least the entire flatbed surface. The reach of the camera system is also known as a field of view of the camera system. According to a preferred embodiment, the camera system is disjointed from the print head in order to have the reach of at least the entire flatbed surface.

In an alternative embodiment, the printing system is provided with at least one marker on the flatbed surface in order to derive the size and position of the piece of media on the flatbed surface. This is made possible since the control system knows a size of the at least one marker and/or a position of the at least one marker on the flatbed surface.

Using the derived size and position of the piece of media on the flatbed surface, the controller is configured to position the print head above the piece of media in order to print the digital image on the piece of media by ejecting recording material on the piece of media. The controller is configured to submit signals to the print head for ejecting drops of recording material on positions on the piece of media in accordance with the digital image. The print head may be moved relative to the flatbed surface and relative to the camera system.

According to an embodiment of the method, the flatbed printer comprises a camera-projector system, which comprises the camera system and a projector system, the method further comprising the step of projecting the digital image towards the flatbed surface with the projector system in order to present to an operator a location on the piece of media at which location the digital image is intended to be printed on the piece of media, and printing the digital image on the piece of media at the location of the projected digital image.

The camera-projector system comprises at least one camera and at least one projector.

The at least one camera may be replaced by at least one captor and/or sensor, if the captor and/or sensor are capable of executing the same task as the at least one camera. The at least one camera may be of the type RGB or RGB-D. One camera is enabled to register each piece of media, which is placed on the flatbed surface. A digital image derived from the registering actions of the camera is processed by an image processing software component stored in the controller in order to detect the shape, the position and the size of the piece of media on the flatbed. Properties of the piece of media, like width, length, area size and contour may be derived from the detected shape and size. A piece of media placed on the flatbed may have an arbitrary position on the flatbed surface, an arbitrary shape and a suitable size.

The at least one projector is configured to project a digital image stored in the controller towards the flatbed surface in order to print the digital image on a piece of media.

The piece of media may already been placed on the flatbed surface before the digital image is projected on the flatbed surface. However, the digital image may also be projected on the flatbed surface before the piece of media is placed on the flatbed surface and before the detection of the piece of media on the flatbed surface.

A digital image received by the controller and intended to be printed on the piece of media, may have dimensions adapted to the detected shape and derived properties of the piece of media. The projector of the camera-projector system projects the digital image towards the flatbed surface. The projection may be such that the projection at least partially fits on the piece of media. The operator may move the piece of media on the flatbed surface in order to get a wished position of the digital image on the piece of media. The detected position of the piece of media on the flatbed surface and the digital image information is used for controlling the ejection of recording material towards the surface of the flatbed. When printing is started by the operator, a gantry may be moving over the flatbed in the first direction and the print head may be moving along the gantry in the second direction in one or more passes, or a flatbed wide print head may be moving in one direction over the flatbed surface. The print head may be moved relative to the flatbed surface and relative to the camera system. The digital image is printed on the piece of media at the location of the projected digital image. Recording material according to the digital image is ejected just on top of the piece of media. Another advantage of this method is that simultaneous detection of multiple pieces placed on the flatbed surface is made easy in an accurate way with the camera-projector system.

According to an embodiment, the method further comprises the steps of detecting gestures at the projected digital image with the camera system, adjusting the digital image with the controller according to the gestures, and projecting the adjusted digital image with the projector system on the piece of media on the flatbed surface. A gesture is defined as a movement of at least one finger of a hand of an operator. The gesture may be defined and represented by a group of at least one image stored in the controller of the flatbed printer or parameterized by a group of parameters stored in the controller of the flatbed printer. A gesture determines an image processing action to be applied on the digital image. Different detected gestures determine different image processing actions.

The present invention also relates to a flatbed printer comprising a flatbed surface for placing a piece of media to be printed upon, a controller configured to control the printing of digital images, a print head for ejecting recording material on the piece of media, the print head being movable over the flatbed surface, and a camera system connected to the controller, the camera system for capturing images from the flatbed surface, wherein the controller comprises a first image processor configured to detect the piece of media positioned on the flatbed surface with the camera system, and a second image processor configured to adapt a digital image to be printed in order to fit the digital image on the detected piece of media, and wherein the controller controls the print head in order to print the digital image on the piece of media according to a position of the piece of media on the flatbed surface.

According to an embodiment, the flatbed printer comprises a camera-projector system connected to the controller and at least partially positioned above the flatbed surface, the camera-projector system comprising the camera system and a projector system for projecting digital images towards the flatbed surface, and wherein the projector system is configured to project the digital image at the detected position on the piece of media, and the controller controls the print head in order to print the digital image on the piece of media at a location of a projection of the digital image by moving the print head over the flatbed surface.

According to an embodiment of the flatbed printer, the controller comprises a gesture detector configured to detect gestures at the projected digital image with the camera system, the second image processor is configured to adjust the digital image according to the gestures, and the projector system is configured to project the adjusted digital image on the media on the flatbed surface. A gesture is defined as a movement of at least one hand of the operator. The gesture may be defined and represented as a group of at least one image stored in the controller of the flatbed printer or parameterized by a group of parameters stored in the controller of the flatbed printer. A gesture determines an image processing action to be applied on the digital image. Different detected gestures determine different image processing actions.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
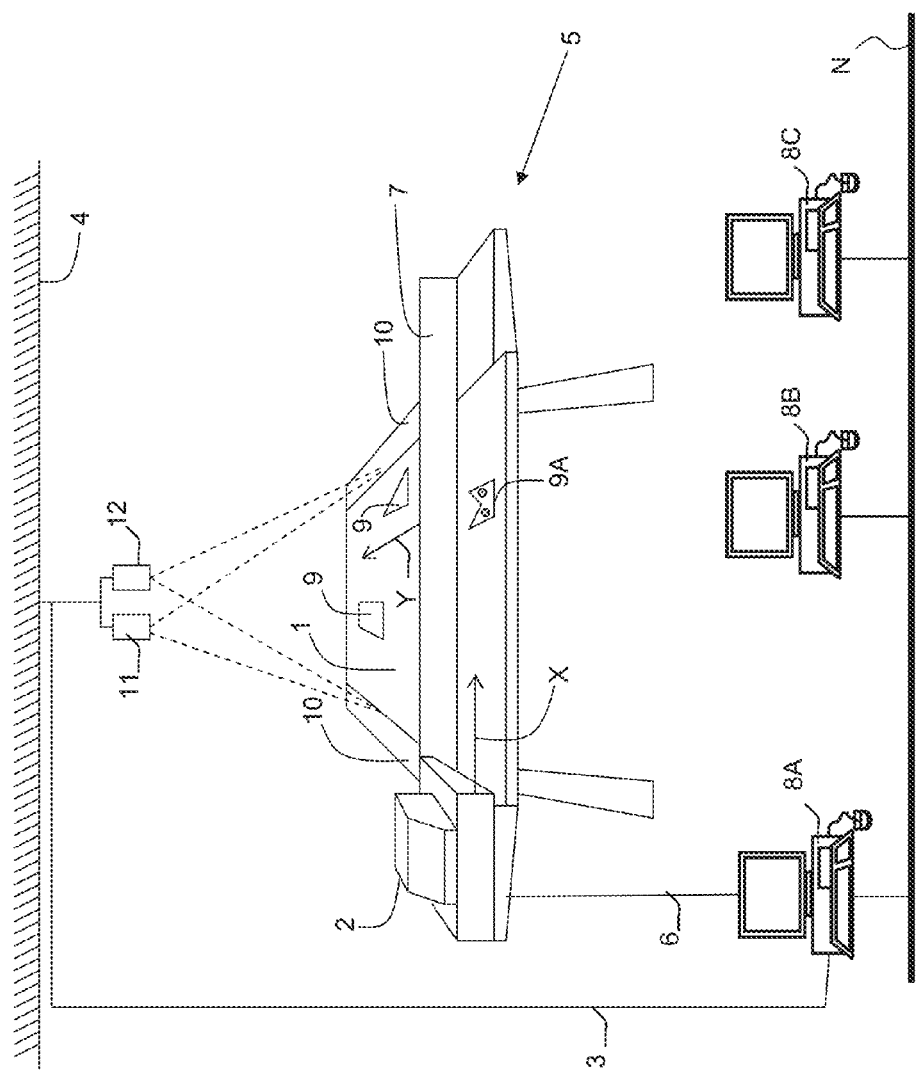
FIG. 1 illustrates a print system configured to apply the method according to an embodiment of the present invention.

The present invention will now be described with reference to the accompanying drawings, wherein the same reference numerals have been used to identify the same or similar elements throughout the several views.

FIG. 1 illustrates a print system 5 comprising a number of workstations 8B, 8C, which may be personal computers or other devices for preparing image data for prints to be printed. These workstations have access to a network N for transferring the image data to a printer controller 8A that is configured to receive print jobs for prints and derive pass images. The printer controller 8A may be part of the print system 5 that further comprises a print head 2 for applying colorants, for example cyan (C), magenta (M), yellow (Y), black (K) and white (W) colorant, or varnish to pieces 9, 9A of flat print media placed on a flatbed surface 1 in order to obtain a printed image. The flatbed surface 1 is the surface of the flatbed, which is at least partially printable by the print head 2. It is noted that the pieces may be of an arbitrary shape and at an arbitrary position on the flatbed surface 1. The pieces are so small that they are completely placed on the flatbed surface 1 or a piece of media may be larger than the flatbed surface, in which case an image which is going to cover an entire piece of media must be printed into a plurality of parts of the image. A first piece 9A has already been printed upon, while the other pieces 9 are not provided with any recording material yet. The print head 2 reciprocally scans the flatbed surface 1 in the second direction X along a gantry 7 perpendicular to a first direction Y of the gantry 7 over the flatbed surface 1 along guiding parts 10. During printing of an image on the piece 9, 9A of media, the piece 9, 9A of media is not moved on the flatbed surface 1. This way of working is advantageous for rigid print media. A print head, which is as wide as the flatbed surface may also be envisaged within the scope of the present invention. Such a print head may be moveable in at least one direction over the flatbed surface 1. Above the flatbed surface 1, a camera-projector system is placed, which is connected via a wired or wireless (not shown) network connection 3 with the printer controller 8A. The camera-projector system comprises at least one camera 11 and at least one projector 12.

The camera-projector system is, for example, attached to the ceiling 4 of a room in which the print system 5 resides. Other bodies for attaching the camera-projector system like a framework or a pole may be envisaged. The camera-projector system may also be attached to the print head or to the gantry. The reach of the at least one camera 11 is at least an entire flatbed surface 1 and the reach of the at least one projector 12 is at least the entire flatbed surface 1, as indicated by dashed lines in FIG. 1. The reach of the at least one camera 11 and the at least one projector 12 may be extended to the guiding parts 10. The camera-projector system is calibrated with respect to a focal length, an optical center, a pixel ratio and radial and tangential distortions. The camera may be for example set to full HD (1080 Pixels), the projector may be for example set to 720 Pixels. A projected line thickness may be for example at least 2 mm. Determining the position of a media piece may be for example established up to 0.3 mm in average. The camera optical center may be for example approximately 226 cm above the flatbed surface. According to another embodiment, digital images are projected on the flatbed surface with the projector 12, and afterwards pieces of media 9, 9A are placed on the flatbed surface, for example at the locations of the projected digital images. Then, the pieces of media 9, 9A are detected by the camera 11.

The printer comprises a user interface which, in this embodiment, is integrated in printer controller 8A for selecting a print job and optionally adapting a print job parameter, such as a print mode, which controls the number of passes over a given swath on the print media. In another embodiment, a user interface is provided as a network site that is accessible with a browser on a client computer.

After sending a print job comprising image data from a workstation to the printer controller 8A, the print job will be made visible on the user interface. It may be scheduled for further processing after selection from a list of print jobs or, alternatively, if the print job is on top of the list of print jobs. The print job comprises parameter values that determine the way the image data are to be printed, such as the way how the image data are to be converted into print data.

Figure 16:
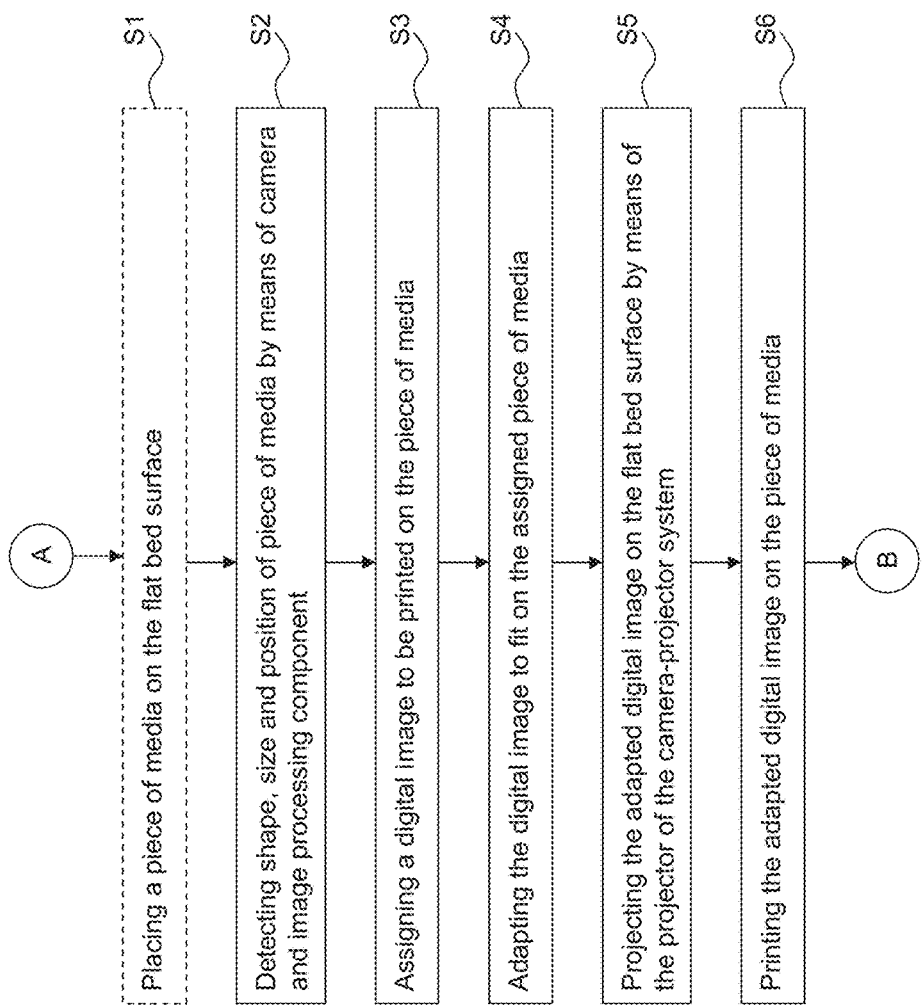
FIG. 16 is a flow diagram of an embodiment of an embodiment of the method according to the present invention.

An embodiment of the method according the present invention will be explained with a flow diagram shown in FIG. 16.

A first step S1 may be executed by the operator indicated by the dashed rectangle block, while the other steps S2, S3, S4, S5, S6 may be executed with the printing system 5.

In the first step S1, the operator places at least one piece (for example the pieces 9, 9A of FIG. 1) of media on the flatbed surface 1. The camera 11, which may be switched on when the printer system 5 is switched on, registers every piece of media that is placed on the flatbed surface 1. The registering signals are sent to the printer controller 8A with the connection 3. The printer controller 8A comprises an image processing component (not shown), which generates a digital image of the flatbed surface 1 and everything in the reach of the camera 11 towards the flatbed surface 1. The digital image comprises sub images of the pieces on the flatbed surface 1. The image processing component comprises software for detecting the pieces in the digital image, in particular the edges of the pieces.

In another embodiment, the flatbed surface 1 is a flat conveyor belt construction on which the pieces of media are automatically placed by a robotic device. Another image processing component may be used to create a set of digital images when registering the moving pieces of medium on the belt. In this embodiment, the gantry 7 may be stationary in the second direction Y, while the print head of the print engine 2 is as wide as the length of the gantry across the belt, so as to be able to eject recording material along an entire surface of the conveyor belt.

In a second step S2, a shape, position and/or size of a sub-image of a detected piece is derived from the digital image with the image processing component. The shape, position and/or size of the sub-image of the detected piece are stored in a memory of the printer controller 8A for later use. As soon as the shape and position of the sub-image is derived, a second digital image is composed showing the contour of the detected sub-image in a color deviating from the color of the flatbed surface 1 and deviating from the color of the medium of the detected piece placed on the flatbed surface 1. The composition of the second digital image may be realized by known erosion image processing techniques for extracting a boundary of a geometric two-dimensional object. The second digital image is transferred to the projector 12 of the camera-projector system and projected on the flatbed surface in such a way that the contour of the piece placed on the flatbed surface 1 are accentuated with the projected second digital image. By projecting the second digital image, the operator is now able to see that the printing system 5, in particular the printer controller 8A, has recognized the piece of media placed on the flatbed surface 1. The description of the second step S2 so far comprises one piece of media, but the detection of multiple pieces placed on the flatbed surface 1 is within the scope of the method according to the present invention.

In a third step S3, a digital image residing in the printer controller 8A is scheduled to be printed by the printing system 5. The operator may use a user interface application for assigning a digital image to a piece of media placed on the table, for example by showing the digital image of the flatbed surface 1 on the user interface, showing the digital image to be printed on the user interface and dragging the digital image to be printed to the sub-image of the piece in the digital image of the flatbed surface 1. According to another embodiment, the printer controller automatically assigns digital images to detected pieces of medium on the flatbed surface 1. This is in particular advantageous when it does not matter on which piece a digital image is printed, for example when all detected pieces of medium have a same shape. Such an assignment does not need to establish a one-to-one corresponding map, since more than one digital image may have to be printed on the same detected piece of media.

In a fourth step S4, a digital image to be printed on a piece of media assigned to the digital image is adapted with the image processing component in the printer controller 8A in order to fit the digital image in the sub-image of the detected piece of media of the digital image of the flatbed surface 1. The adaptation may be a scaling operation upon the digital image, a rotation of the digital image, a shift of the digital image and/or a mirror operation on the digital image. The scaling and the rotating may be such that the digital image fits within the boundaries of the sub-image of the detected piece of media. It is noted that the fourth step S4 is optional. The digital image may be unaltered before the next step is performed.

In a fifth step S5, the digital image as adapted or not is projected on the flatbed surface 1 with a projector system 12 of the camera-projector system. By doing so, the sub-image of the detected piece of media is exactly projected on the piece of media placed on the flatbed surface 1. The operator is able to see at which position the digital image is intended to be printed upon the piece of media. The projection may be established in a direct way from the projector system 12 to the flatbed surface 1. According to an alternative embodiment, the projector system 12 also comprises a mirror system for guiding light beams from the projector system 12 to the flatbed surface 1.

In a sixth step S6, the digital image as adapted or not is printed on the piece of media placed on the flatbed surface 1. According to the projection, the print head 2 may be moved along the gantry 7 in the first direction X in at least one pass for each swath and moving the gantry 7 over the flatbed surface 1 in the second direction Y perpendicular to the first direction X. This is possible since the position of the piece of media on which the digital image has to be printed is known to the printer controller 8A, since the position, the shape and the size has been stored in the memory of the printer controller 8A during the second step S2. The displaying of the projected images on the flatbed surface 1 may be ceased when printing is started. According to a further embodiment, the displaying of projected images continues during printing, but the projected images are adapted at predetermined time intervals during printing in such a way that the parts of the images that have already been printed upon the media pieces are not projected, while the parts that have not yet been printed upon the media pieces, are displayed by projection.

Figure 2:
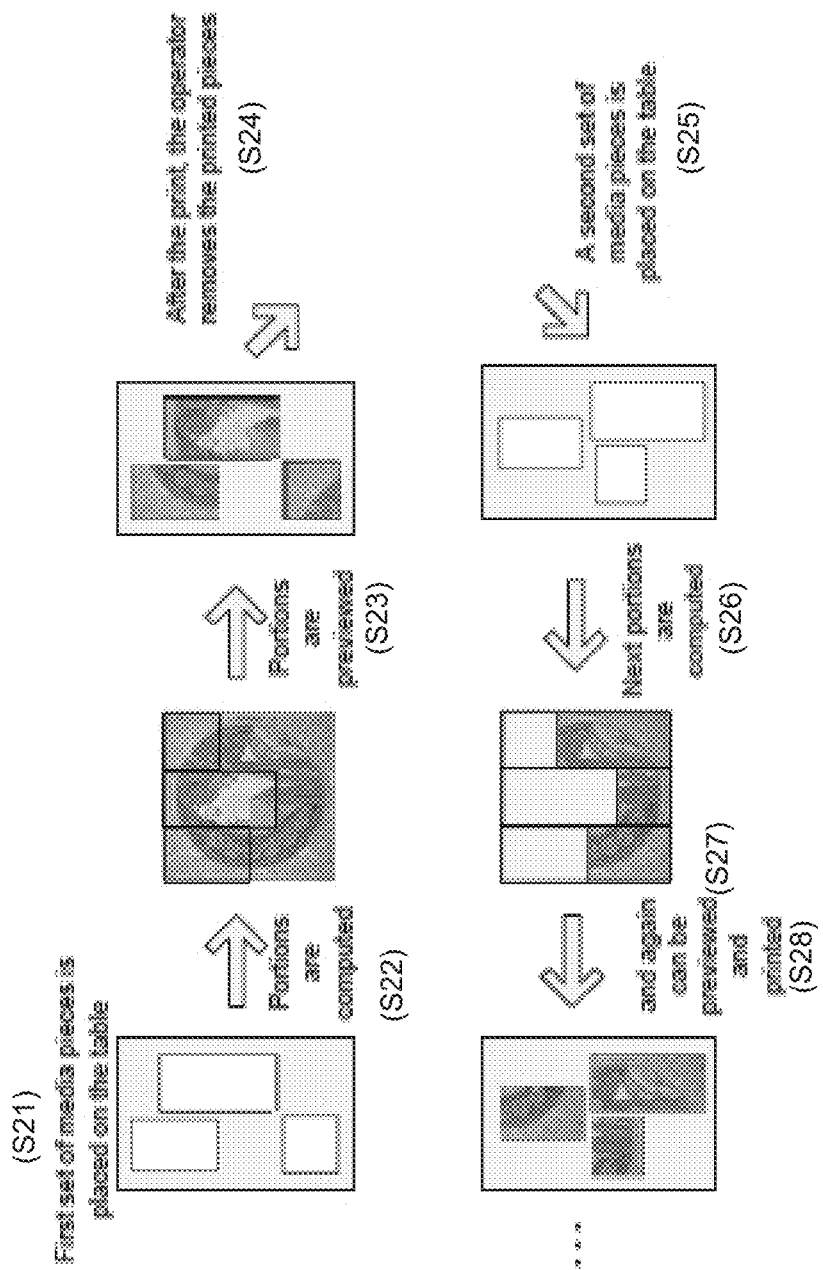
FIG. 2 is a schematic diagram of an embodiment of the method according to the present invention, including detection of a shape of several pieces of media, and automatic split of the print content onto the pieces of media.

According to an embodiment, shown in FIG. 2, the media pieces are detected on the flatbed surface and a digital image to be printed is split according to the shapes of the media pieces.

In a first step S21, a first set of media pieces is placed on the flatbed surface by an operator or by a placing device. In a second step S22, portions of the image that can be printed on the first set are computed. The computed portions are projected on the media pieces as a preview. In a third step S23, the portions are printed on the media pieces. After the printing of the portions, in a fourth step S24, the printed media pieces are removed by the operator or an additional removing device. If not, an entire image is printed, and in a fifth step S25, a second set of media pieces is placed on the flatbed surface. In a sixth step S26, next portions are computed taking into account the already printed portions. In a seventh step S27, the computed next portions are projected on the media pieces as a preview. In an eighth step S28, the next portions are printed, etc. The pieces of the media can be placed next to each other on the flatbed surface or if some are too big they can be placed one after each other. For each piece, the printer controller computes the portion of the digital image to print. This embodiment is applicable when printing a long or large image on several panels that will be assembled to build the final product, e.g. different panels composing a wall or a ceiling. It is noted that the media pieces may be of different shape or size. With this embodiment, the original digital image is not modified. The user does not need to create and identify intermediate files. The size of each piece of media can still be changed just before printing. Not only rectangular digital images are managed, but also image portions of any shape. The operator places the media pieces on the flatbed surface and asks (via an interactive menu projected on the flatbed surface or via a local user interface of the flatbed printer system) for the shape detection. The flatbed printer system uses the camera-projector system to acquire videos or photos of the flatbed surface. The printer controller detects the shapes of the media pieces directly from the video or photo streaming by using image processing algorithms like segmentation or statistics. The operator selects a file to be printed from a job queue. Algorithms are nesting the detected media shapes on the file and are extracting the corresponding portion for printing. On a user interface, the portions are drawn on the image preview and the operator manually modifies, if needed, the placement of the portions on the image. The algorithms may be tuned to organize the portions left to right then top to bottom. The intermediate portion files are computed and managed locally by the printer controller and are not known to the operator. The operator then acknowledges the portioning for the current pieces of media and launches the print. Once printed, the media pieces are removed from the flatbed surface. Then, more pieces of media can be placed on the flatbed surface. The embodiment continues the same portioning operation with the remaining part of the original file.

Figure 3:
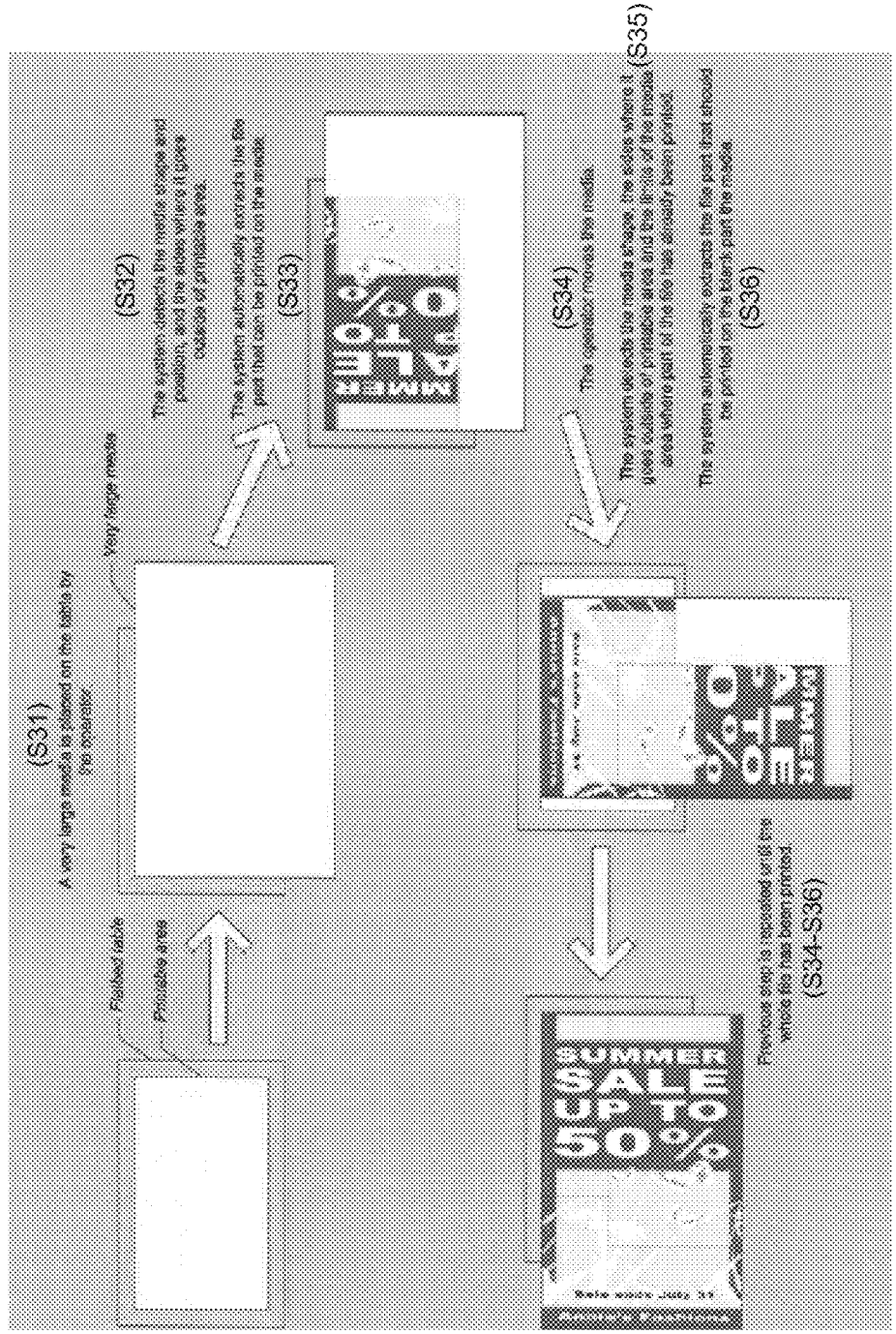
FIG. 3 is a schematic diagram of an embodiment of the method according to the present invention, including automation of a file decomposition and printing on a very large piece of media.

According to an embodiment, shown in FIG. 3, the method comprises the step of automating a decomposition of a print job into several parts, wherein the print job is to be printed on a media that does not fit in the printable area of the flatbed surface. The detection of the shape of the media is used for determining which part of the file can be printed in the current pass. In a first step S31, a large media is placed on the flatbed surface by the operator. In a second step S32, the camera-projector system detects the media shape and position, and the sides where it goes outside of the printable area. In a third step S33, the system automatically extracts a file part that can be printed on the media and prints it on the media. In a fourth step S34, the operator moves the media. In a fifth step S35, the system detects the media shape, the sides where it goes outside the printable area and the limits of the media area where part of the file has already been printed. In a sixth step S36, the system automatically extracts a file part that should be printed on the blank part of the media. The previous steps S34-S36 are repeated until an entire file has been printed. The camera-projector system detects the directions in which the media sides extend outside of the printable area. The information of the media area already printed and the matching file parts are kept in storage for identifying the next file part to print and aligning it with the previous parts. With this embodiment, the operator does not need to create and identify intermediate files. The placement of the media and the corresponding printable area can still be changed just before printing. An operator selects a file to be printed from a job queue. An algorithm places the file on the detected media and extracts the file part that can be printed on the media. The file part is drawn on a user interface on an image preview or directly projected on the media piece. The operator manually modifies, if needed, the selection of the file part to print on the detected media. The file part corresponding to the detected area is computed and managed locally by the system and not handled by the operator. The operator then acknowledges the selection and position of the file part and launches the print. Once the media area is printed, the operator moves the media to place an unprinted area of the media piece in the printable area of the flatbed surface. Another algorithm identifies the next file part to print on the media, based on the knowledge of what parts of the file have already been printed, the detection of the media part in the printable area of the flatbed surface, the detection of the media sides extending outside of the printable area and the detection of the limits of the file parts already printed on the media piece. The file part corresponding to the new media area to print on is drawn on the user interface on the image preview or directly projected on the media. The operator then acknowledges the selection and position of the file part and launches the print. These steps are repeated until the file has been completely printed or the media is fully covered.

According to an embodiment, the method further comprises the step of projecting a cut path on the piece of media, said cut path circumscribing the projected image on the piece of media. The projected image on the media on the flatbed is automatically circumvented with a cut path for later use by a finishing system, like a cutting system. Since the shape of the media is known, the cut path that intersects with the media may be projected on the media. In a further embodiment, the cut path is changeable with gestures to be registered by the camera-projector system. The camera may detect movements or gestures of the operator with respect to the cut path. The cut path may be adapted according to those movements or gestures. The cut path may be moved, scaled or rotated. The direction of the cut may also be visualized or modified, i.e. cut path via points ABCA or points ACBA, directly on the media combined with the projected image. The movements of the operator are detected by the printer controller of the flatbed printer. The gesture detection device may be a camera or a Kinect-like sensor being part of the camera-projector system. The resulting preview becomes the new cut configuration, which is stored in the storage of the printer controller of the flatbed printer and transferred via a connection to a storage of the finishing system, which is connected to a camera-projector system that is similar to the camera-projector system of the flatbed printer. The finishing system may be used after the images have been printed on the media by the flatbed printer, and the media pieces are removed from the flatbed surface and fed to the finishing system. Since the finishing system may also be equipped with a similar camera-projector system as the flatbed printer, the finishing system is able to detect the cut path—adapted or not—and to finish the printed media according to the cut path.

Figure 6:
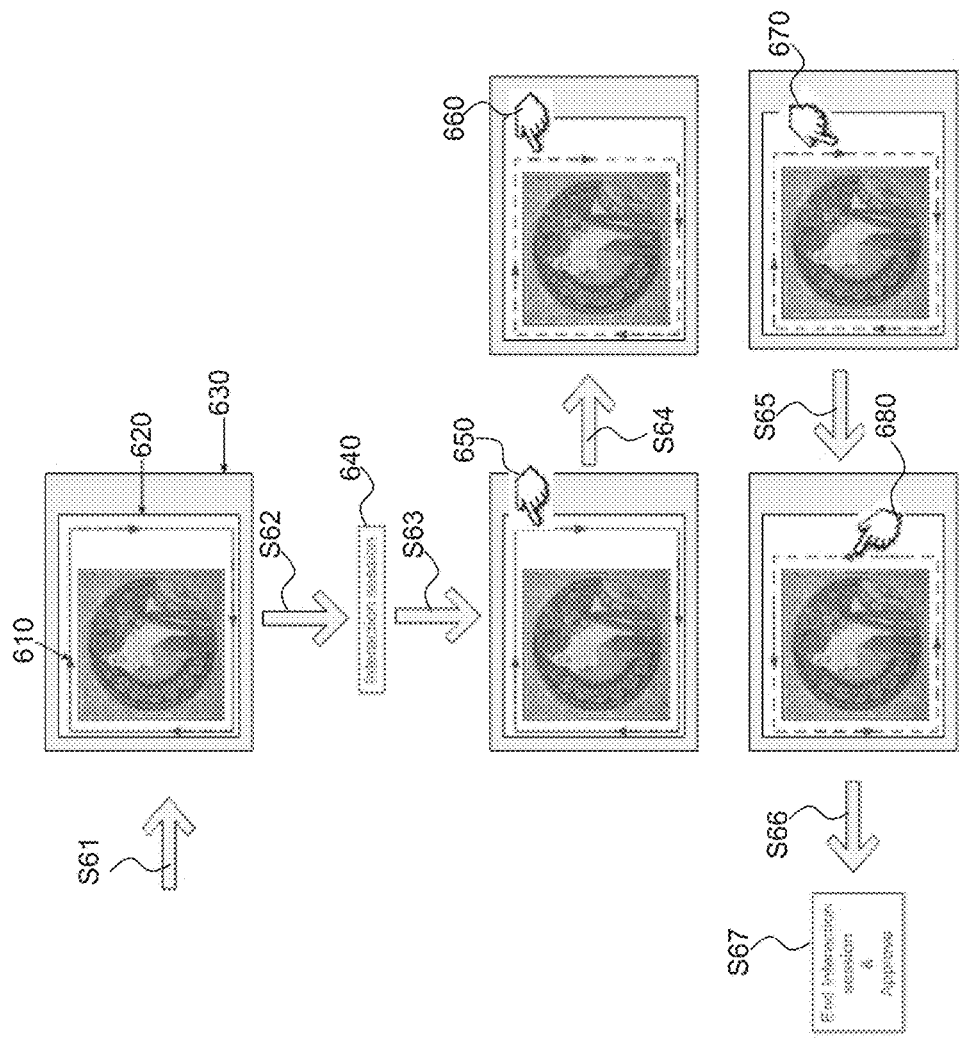
FIG. 6 is a schematic diagram of an embodiment of the method according to the present invention, including configuring a cut path of a print by hand gestures directly on the projected preview.

According to an embodiment shown in FIG. 6, in a first step S61, the image to be printed and a cut path 610 is projected on a piece of media 620 placed on the flatbed surface 630. In a second step S62 an interaction session 640 is started on a user interface of the flatbed printer. The interaction session 640 may be started by detecting a specific gesture. After the interaction session 64 has been started, the user or operator is making hand movements, for example gestures, at the flatbed surface. In a third step S63, the hand position 650 and the hand movements are detected by the camera. The camera detects a hand movement from a first position 650 to a second position 660. In a fourth step S64, the cut path is adjusted to the hand movement. The camera detects a hand twist from a third position 670 to a fourth position 680. In a fifth step S65, the cut direction—indicated by arrows on the cut path—is inverted by the hand twist. In a sixth step S66, a menu option on the user interface allows the saving of all changes. The fourth step S64 and the fifth step S65 may be applied separately or after each other in an arbitrary order. In a seventh step S67, the interaction session is ended and the changes are approved. The changed cut path is now ready for a finishing system comprising a cutting device.

Figure 4:
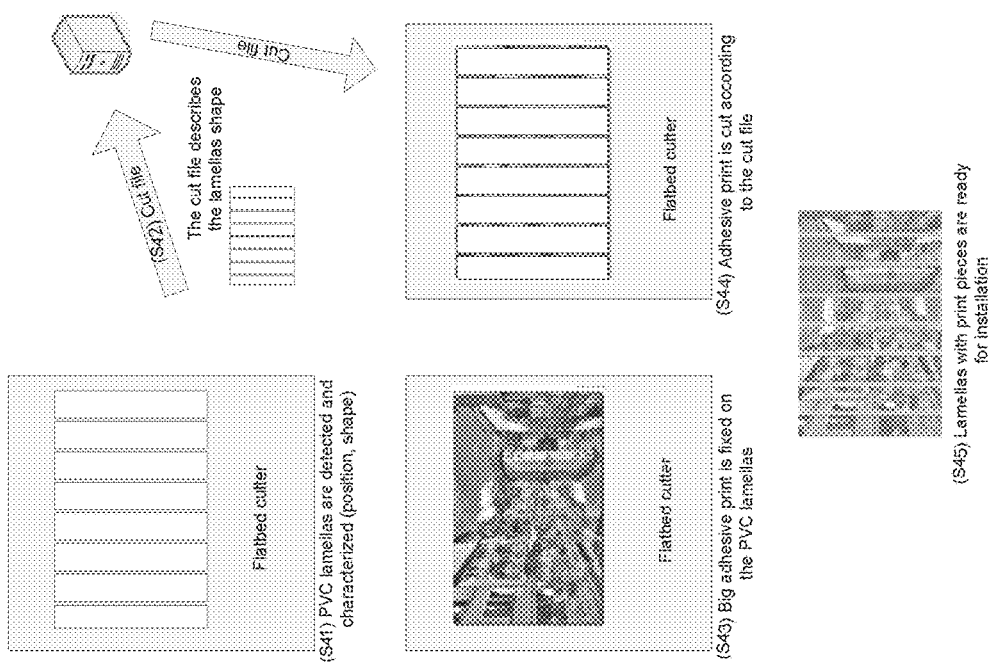
FIG. 4 is a schematic diagram of an embodiment of the method according to the present invention, including detecting a shape of one or several pieces of media in order to automatically generate a cut path file.

According to another embodiment shown in FIG. 4, in a first step S41, a plurality of media pieces like PVC lamellas are detected and characterized (position and shape). In a second step S42, a cut file is generated that describes the lamellas shape. The generated cut file is stored in a storage device. In a third step S43, a big adhesive print is fixed on the PVC lamellas. In a fourth step S44, the adhesive print is cut according to the cut file after retrieval of the cut file from the storage device and interpretation of the cut file. In a fifth step S45, the lamellas with print pieces are ready for installation.

Figure 5:
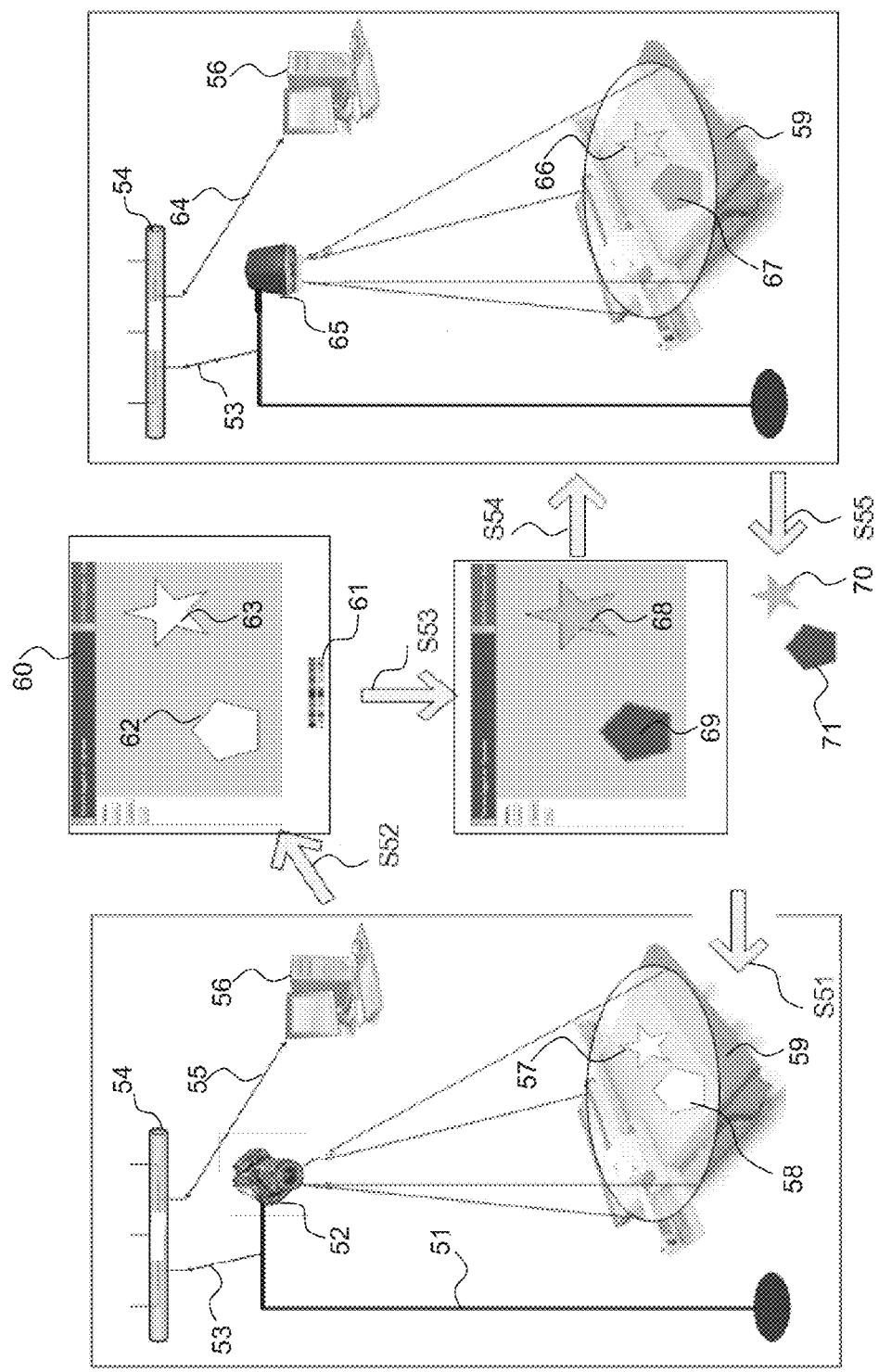
FIG. 5 is a schematic diagram of an embodiment of the method according to the present invention, including automatic painting of a complete surface of one or several pieces of media.

According to an embodiment,—an example is shown in FIG. 5—a media piece 57, 58 on the flatbed surface 59 is painted with a background color, e.g. for backlit applications printed on a transparent media, or is applied with a varnish layer on top of the media piece 57, 58 without any preparation of a print file. The camera 52 on a pole 51 detects the shape and position of a media piece 57, 58 on the flatbed surface 59 and the operator may choose a color or varnish option from a list 61 of colors or varnishes. The list 61 is part of a user interface screen 60 displayed on a printer controller system 56. The printer controller system 56 can be a computer connected to a network 54 for receiving and sending photo/video images. The camera 52 is also connected via a line 53 to the network 54 for enabling an image video stream from the camera 52 to the printer controller system 56 via another line 55. From the camera images, the printer controller 56 defines the appropriate decisions for automatically creating a digital image to be printed at the right position with the right color, size and shape. According to an embodiment shown in FIG. 5, in a first step S51, media 57, 58 of any shape is placed on the flatbed surface 59. It should be noted that the camera 52 is fixed on a pole 51, but fixation to a ceiling is also conceivable. The image video data are sent from the camera 52 via the network 54 to the printer controller 56 for video and photo streaming analysis. In a second step S52, the shapes 57, 58 are detected and displayed as shapes 62, 63 on a user interface system 60. In a third step S53, the shapes 62, 63 are selected one at a time or by multiple selections and filled with a color selected from the list 61, resulting in color filled shapes 68, 69. In a fourth step S54, the color filled shapes 68, 69 are sent via line 64 (which may be equal to line 55) to the network 54 and via the line 53 to a projector 65, also mounted on the pole 51. The color filled shapes are projected on the flatbed surface 59 as a preview of shapes 66, 67. In a fifth step S55, a digital image, for example a floating bitmap, is generated by the printer controller 56 and printed on the media pieces 57, 58 with an ejected colored ink or varnish resulting in printed media pieces 70, 71. The printed media pieces 70, 71 may be removed from the flatbed surface 59 for further use.

According to an embodiment, the method further comprises the steps of detecting non-printable areas of the piece of media with the camera-projector system and prohibiting the ejection of recording material on the non-printable areas. The camera and appropriate image processing software detect non-printable areas in the piece of media. The printer controller analyzes the video or photo by using image processing algorithms, and generates a mask showing the shape and the position of the non-printable areas of the media piece present on the flatbed surface. The mask is then used in combination with the digital image to be printed, to prevent recording material at undesired locations. This method can address very complex shapes. An example of non-printable areas is holes in ceiling perforated tiles. The detection may be used to prevent putting recording material on these areas. The printer controller automatically adapts the digital image to the piece of media on which to print. The embodiment prevents obstructing thin holes with recording material and reduces the printing cost. It also avoids jetting recording material on the flatbed surface that will have to be cleaned or on a protection paper that will then have to be thrown away.

Figure 7:
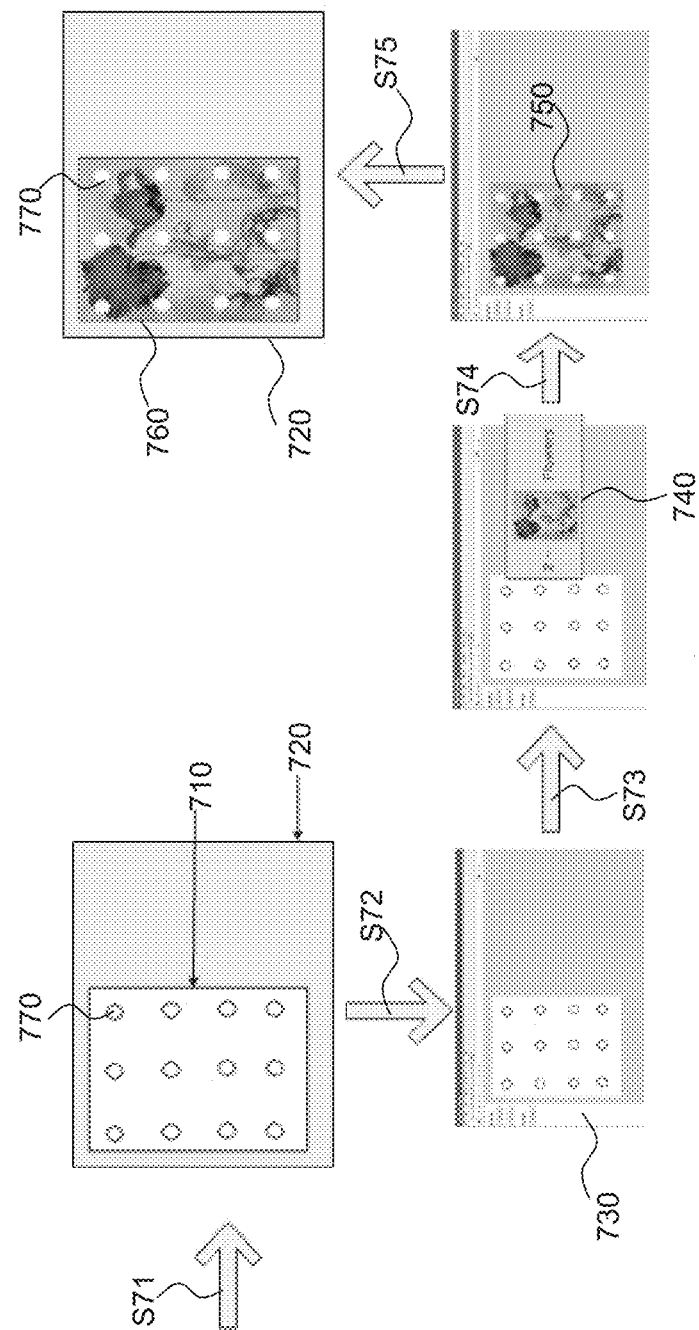
FIG. 7 is a schematic diagram of an embodiment of the method according to the present invention, including an automatic detection of non-printable area of a media.

FIG. 7 illustrates an example of the embodiment. In a first step S71 of the method, a piece of media 710 is detected by the camera on the flatbed surface 720 and its detailed shape is recognized, in particular holes 770 in the piece of media 710. In a second step S72, the detected information is sent to the connected computer system for further analysis. A user interface 730 of the computer system displays the detected shape and may manipulate a complex shape, if necessary. In a third step S73, an image file 740 is selected to be printed on the piece of media 710. Any file may be selected to print on the piece of media. No file preparation is needed. In a fourth step S74, the image is adapted to the shape of the piece of media. The user interface shows an adapted image 750. In a fifth step S75, the adapted image is projected on the piece of media on the flatbed surface 720 as a preview 760. The projection shows the result of the optimized print: no ink will be ejected in the areas 770 of the holes.

According to an embodiment, the camera detects movements made by the operator with his hands to select, move, rotate or scale the projected image. The resulting preview projected on the flatbed surface becomes a new print or cut configuration. What is configured is what is going to be printed or cut. The movements are detected by a gesture detector that is part of the connected computing system. The gesture detector may be a camera or a Kinect-like sensor of the camera-projector system. The detection of the movements may be done on at least one object in the same configuration session. The computing system processes the movements and modifies the print or cut image accordingly. The movements are similar to those used on a touch screen for selecting, moving, rotating or scaling images. Decisions are sent to the various parts of the computing system such as the embedded software of the printer—the printer controller—with the job tickets and documents and/or images to be printed according to the final configuration.

Figure 8:
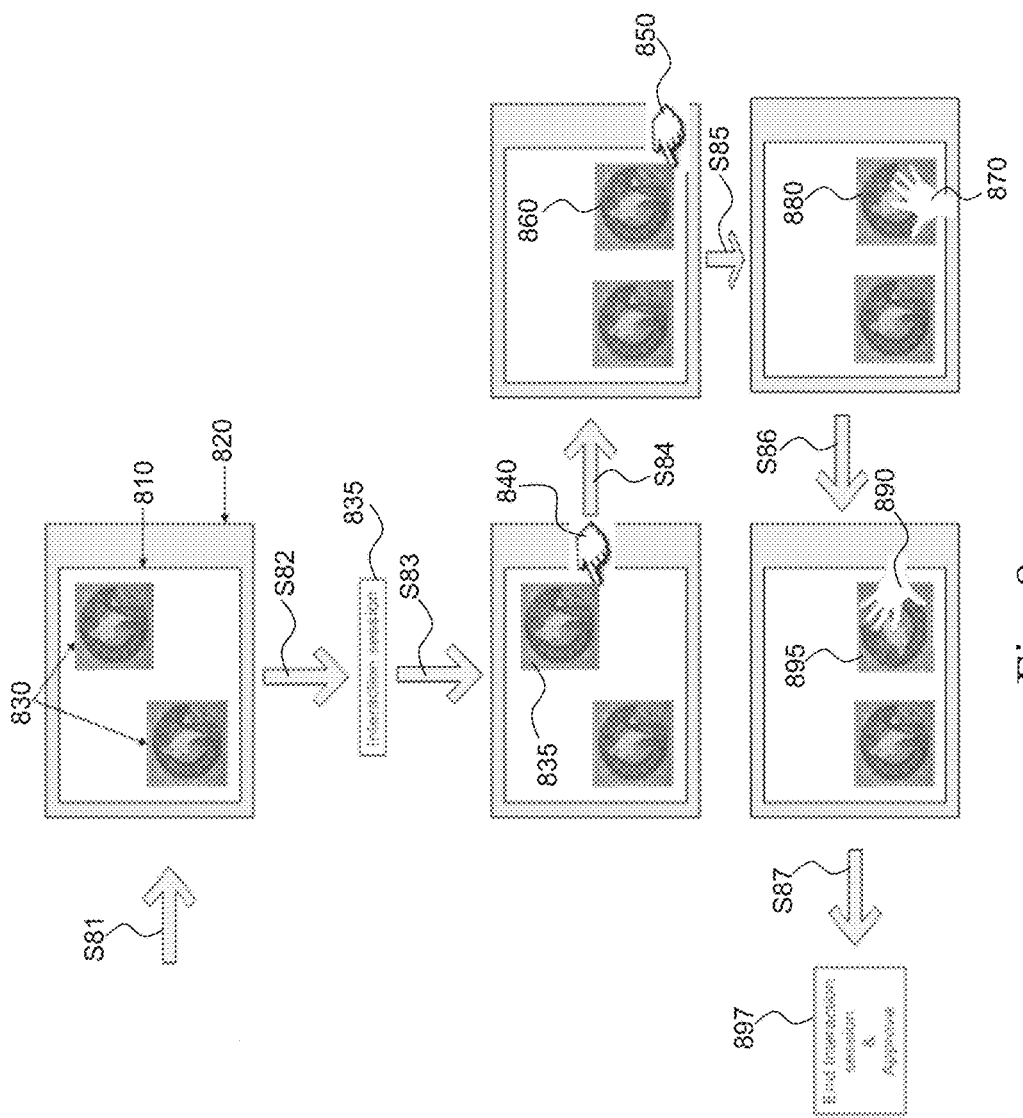
FIG. 8 is a schematic diagram of an embodiment of the method according to the present invention, including configuring a lay out of a print by hand gestures directly on the projected preview.

FIG. 8 illustrates an example of the embodiment. In a first step S81, images 830 are projected on a piece of media 810 placed on the flatbed surface 820. In a second step S82, an interaction session 835 is started on a user interface of a computing system connected to the printer system. In a third step S83, the camera detects a hand position 840 and hand movements. For example, a hand movement from a position 840 to a position 850 is detected. In a fourth step S84, the detected hand movement is interpreted and a corresponding image 835 is adapted to the hand movement resulting in a new position 860 of the image 835. A preview of the piece of media 810 on the user interface may be updated according to the hand movements. In a fifth step S85, the camera detects a new hand position 870 near the moved image 880. In a sixth step S86, the camera detects a hand twist by turning the hand from position 870 to another position 890. The detected hand twist is interpreted and the orientation of the image 880 is changed into the new orientation 895. In a seventh step S87, a menu on the user interface allows the user to save the changes made. The user may establish an end 897 of the interaction session and approve the final layout for printing.

According to an embodiment, the method further comprises the steps of detecting a position of an operator at the flatbed surface with the camera-projector system, projecting a menu of functions available for an operator on the flatbed surface near the detected position of the operator at the flatbed surface, detecting gestures of the operator at the menu, and activating a function indicated by the detected gesture at the menu.

The camera-projector system uses the camera to display a menu of functions available for an operator of the flatbed printer directly near his position at the flatbed surface to avoid the operator walking to the printer local user interface for simple choices. This menu can be directly clicked by a simple finger touch via the detection of the operator's gestures. This embodiment is also applicable to a finishing system, which is also equipped with a similar camera-projector system as the flatbed printer system. This is advantageous, since the flatbed surface is large and the operator does not spend much time walking around the flatbed surface or walking to the local user interface. Simple choices and interactions can be selected without walking to the local user interface or walking around the flatbed surface. The operator can focus on preparing correctly the printer engine or the media without interruptions. The menu of functions may comprise big colored areas. According to an embodiment, the operator selects a function from the projected menu and points at a piece of media placed on the flatbed surface. The pointing action of the operator is a gesture that is suitable for detection by the camera of the camera-projector system. An action corresponding to the selected function from the menu is applied to the piece of media pointed at by the operator.

In a further embodiment, the method further comprises the steps of detecting a change in the position of the operator at the flatbed surface and projecting the menu near the changed position of the operator. The position of the operator at the flatbed surface is detected by the camera and with image processing software in the printer controller. The menu is then projected on the flatbed surface near the position of the operator at the flatbed surface. The projected menu may move along with the displacements of the operator at the flatbed surface.

Figure 9:
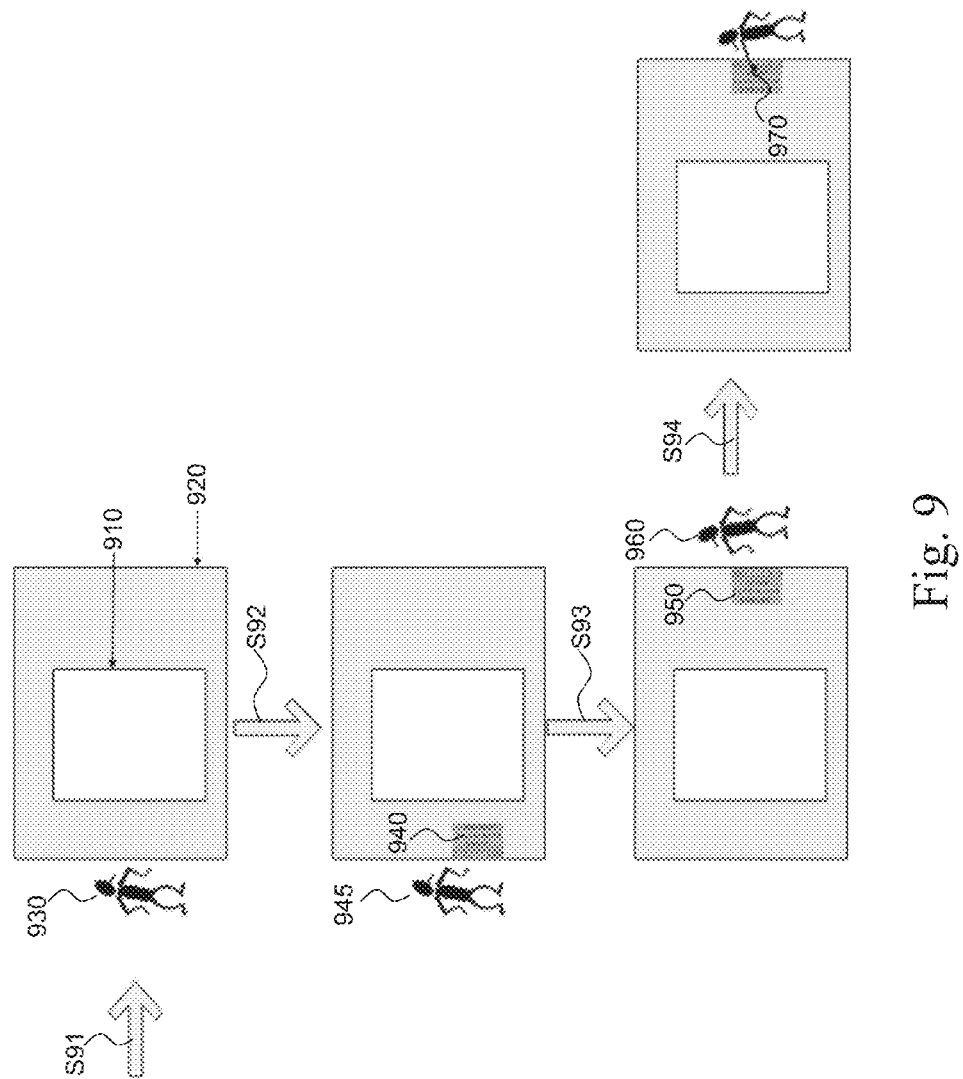
FIG. 9 is a schematic diagram of an embodiment of the method according to the present invention, including projection of a menu directly next to the operator on the flatbed surface.

An example of the embodiment is shown in FIG. 9. In a first step S91, the camera detects the presence of a human being 930 near the flatbed surface 920, for example a detection of a hand on top of the flatbed surface. A piece of media 910 is placed on the flatbed surface 920. In a second step S92, a menu 940 is projected by the projector (not shown) on the flatbed surface near the position 945 of the human being. In a third step S93, the camera detects a movement of the human being along the flatbed surface to a new position 960. The computer system connected to the camera projects the menu at a new position 950 on the flatbed surface near the new position 960 of the human being. In this way, the human being is immediately able to use the menu by gestures or by touching the menu. In a fourth step S94, the human being touches the projected menu, the gesture 970 is detected by the camera and corresponding actions are triggered by the computer system.

In a further alternative embodiment, the projected menu comprises a flatbed surface representation area with predefined locations on the flatbed surface, at which locations the menu is projectable on the flatbed surface, and the method comprises the step of detecting a gesture at one of the predefined locations on the flatbed surface representation area and projecting the menu at a location on the flatbed surface, which location corresponds to the predefined location on the flatbed surface representation area at which predefined location the gesture is detected. The operator may select a location in the representation area by the gesture and the menu moves to the newly selected location. Instead of dragging and dropping the entire menu with a swiping gesture or alike, the operator just selects the location where the menu has to go. The selecting gesture may be a finger or stylus pointing at or a finger or stylus touching at the desired location in the flatbed representation area in the projected menu. This is advantageous in case of a large flatbed surface and the operator is not able to handle everything on the flatbed surface from one position.

According to an embodiment, a tag is printed on a sticker with a unique identification of the media piece. This is possible due to the automatic detection of the shape, the dimensions and the thickness of the media piece on the flatbed surface. The media piece can be a remaining part of a partially printed piece of rigid media. The sticker is put on the object before it is stored in a supplies stock. When the media piece is later placed on the flatbed surface again, the camera-projector system detects the tag present on the media piece and identifies it from a stock system. All print parameters related to the media piece characteristics are automatically used to prepare the print. In particular, the thickness of the media piece is automatically used to tune the height of the print gantry with respect to the flatbed surface. The material characteristics are used to select the appropriate color profile to color manage the print file. When the piece of media is actually printed upon, the identification is automatically removed from the supplies stock. In another embodiment, the tag is a printed RFID tag, a barcode and/or a QR-code. Today, it is possible to print RFID on various media using aluminum for a cheap price. Micro localization RFID systems may be used to detect the RFID from a distance, even without visual contact. Combined with a database of the media properties and shape, it enables the operator the recover media stored away for future use more easily. The operator may perform the following steps. In a first step, the operator prints a specific design by the flatbed printer and cuts the media with finishing equipment. In a second step, the operator asks via the user interface of the flatbed printer system to add an RFID to the left over—if there is enough left over for reuse—and to enter it in a media database. In a third step, the flatbed printer system checks against the database for a piece of media, when printing another document, and when it hits an entry in the database, proposes the operator to retrieve the media from stock. The database may be part of the printer controller but may also be residing on another stock server that is connected to the printer controller.

Figure 10:
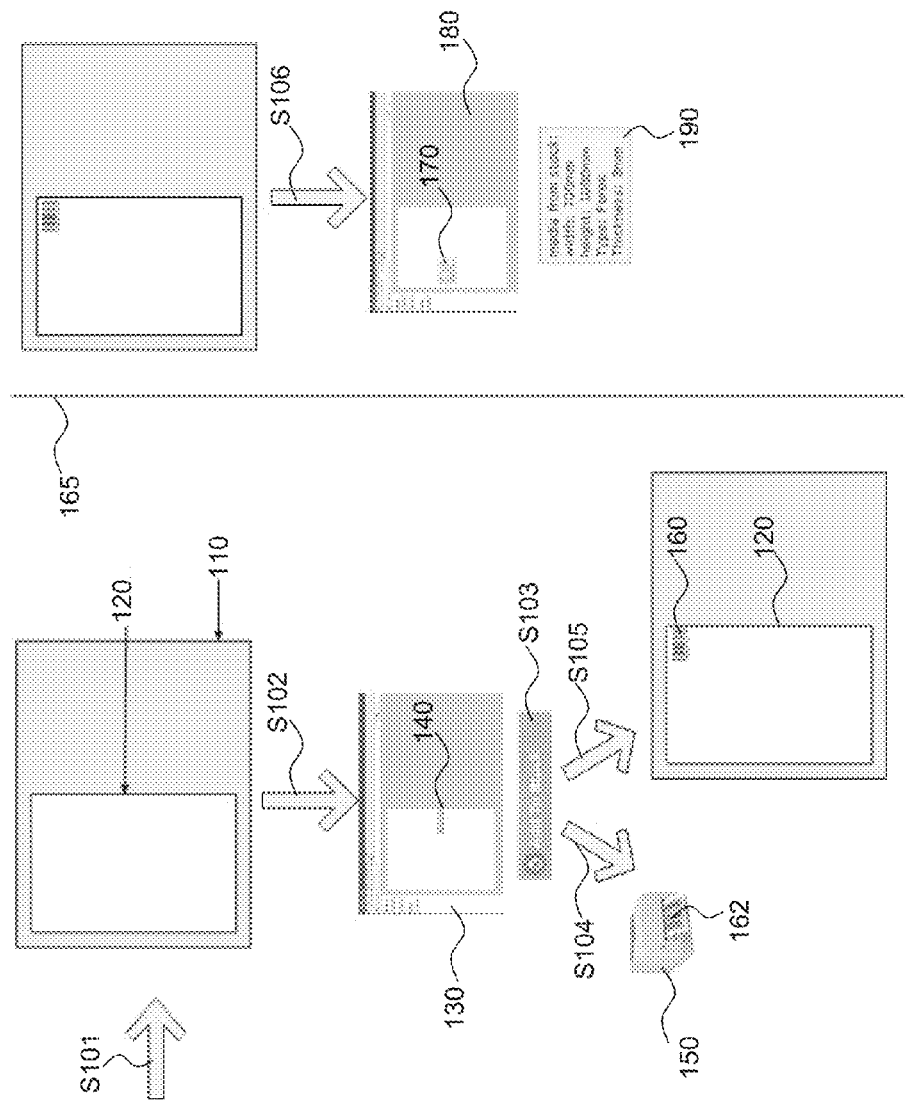
FIG. 10 is a schematic diagram of an embodiment of the method according to the present invention, including identification and recognition of a piece of media present on the flatbed surface.

An example of the embodiment is shown in FIG. 10. In a first step S101, a piece 120 of media is detected on the flatbed surface 110 with the camera. In a second step S102, the detected information is sent to a computer system connected to the printer system. The computer system is equipped with a user interface, which shows screen 130. The screen 130 comprises an action button 140—also shown expanded as item S103—for adding the piece of media 120 to a stock. In a third step S103, an activation of the action button 140 is received by the computer system. Two alternative steps may now follow the third step S103, i.e. a fourth step S104 or a fifth step S105. In the fourth step S104, a bar code is printed on a sticker 162 with a bar code printer 150 connected to the computer system and the sticker 162 is attached to the piece of media 120. In the fifth step S105, the printer system is used to print a bar code 160 directly on the piece 120 of media. The barcode characteristics are linked to the information sent to the computer system in the second step S102.

When a next time—indicated by time separation line 165—the piece 120 of media is put on the flatbed surface, in a sixth step S106, the bar code on the piece 120 of media is detected by the camera. The user interface screen 180 shows the available information 170 about the piece 120 of media. The information is shown expanded in item 190 and comprises, for example, the width, the height, the type and the thickness of the piece 120 of media. If the piece 120 of media is used for printing, the stock administration on the computer system can be updated.

According to an embodiment, the camera films the flatbed surface. The camera streams the video to a remote client computer, a desktop computer or a mobile device. Along with the video, a production status is provided to illustrate the displayed image. The embodiment delivers a fine view of the production activity. The flatbed system uses the camera-projector system attached to a network to acquire video or photos of the flatbed surface of the printing system. This embodiment may also be applied to a finishing system equipped with a similar camera-projector system.

From a remote or mobile location, the user is able to connect or register to an RSS feed or video stream to be automatically updated.

Figure 11:
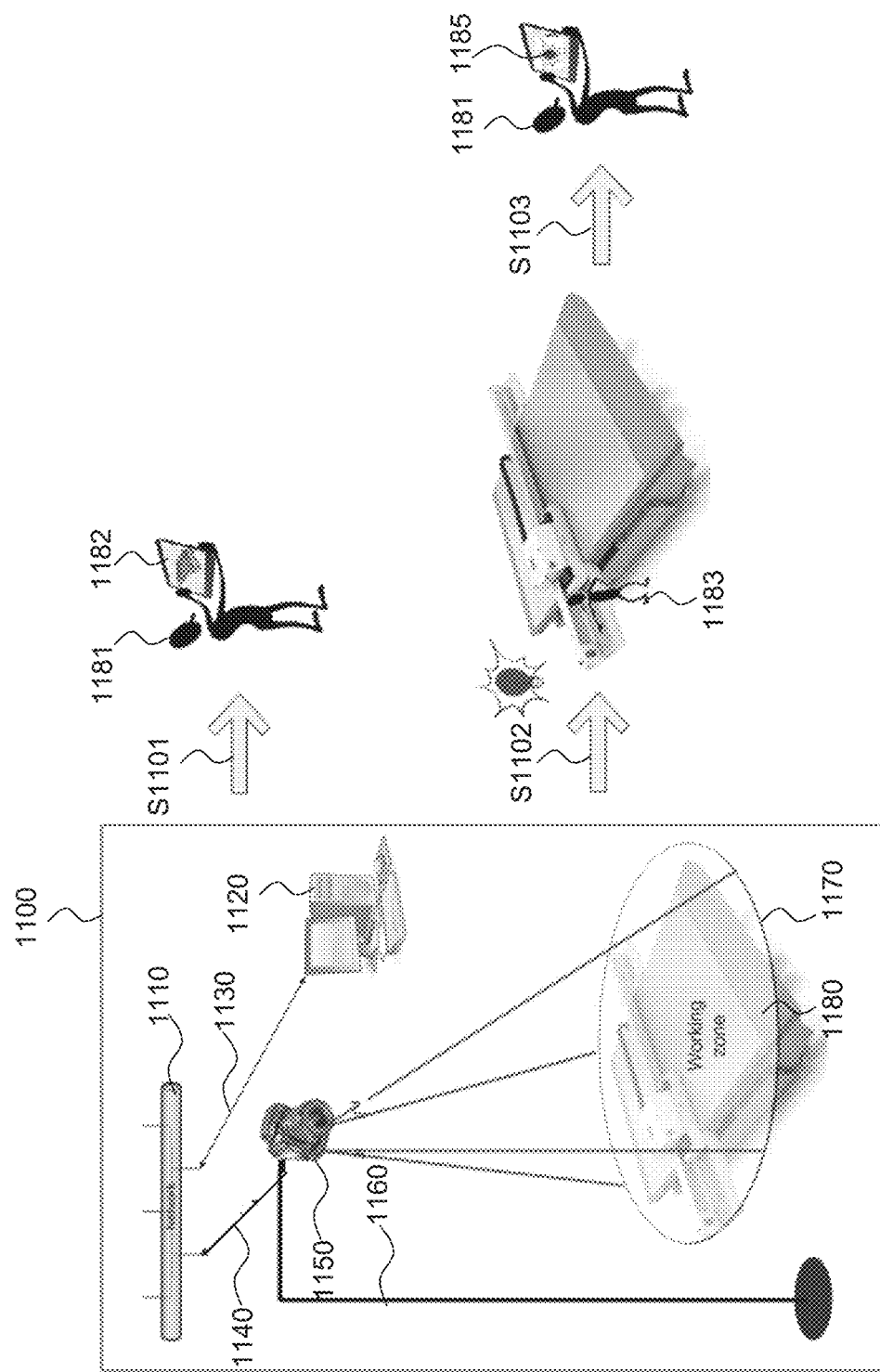
FIG. 11 is a schematic diagram of an embodiment of the method according to the present invention, including video surveillance of a production on the flatbed surface from a remote location.

An example of the embodiment is shown in FIG. 11. The printer system environment 1100 comprises a camera/video system 1150 for transferring an image/video stream 1140 and a computer system 1120 for analysis of the image/video stream 1140 which is connected via a line 1130 to a network 1110. The camera/video system 1150 is also connected to the network 1110. The camera/video system 1150 is mounted on a pole 1160, but may also be mounted on a ceiling. A camera of the camera/video system 1150 captures a working zone 1170 of the flatbed surface 1180. A first operator 1181 has a mobile device 1182, which is wirelessly connected to the computer system 1120. In a first step S1101, a streaming view of what is happening on the flatbed surface 1180 is sent to the mobile device 1182 and shown on a user interface of the mobile device 1182. In a second step S1102, intrusions in the working zone 1170, for example a second operator 1183 walking up to the flatbed surface, are detected by the camera/video system 1150 in combination with analysis of the image/video stream 1140 by the computer system 1120. In a third step S1103, the user interface of the mobile device 1182 displays information 1185 in order to inform the first operator 1181 of any problem.

According to a further embodiment, session modes are defined where the flatbed system is locked for a specific activity and no other inopportune action can be started that could either be dangerous for the operator or produce wrong results. The sessions are defined via the menu projected on the flatbed surface or a menu on the local user interface of the flatbed printing system. A first session is a media characterization session where media can be moved around on the flatbed surface. A second session is a print configuration session where gestures are interpreted to configure the print. A third session is a cut configuration session where gestures are interpreted to configure the cut path. A fourth session is a print session where safety actions are launched and printing is started.

Figure 12:
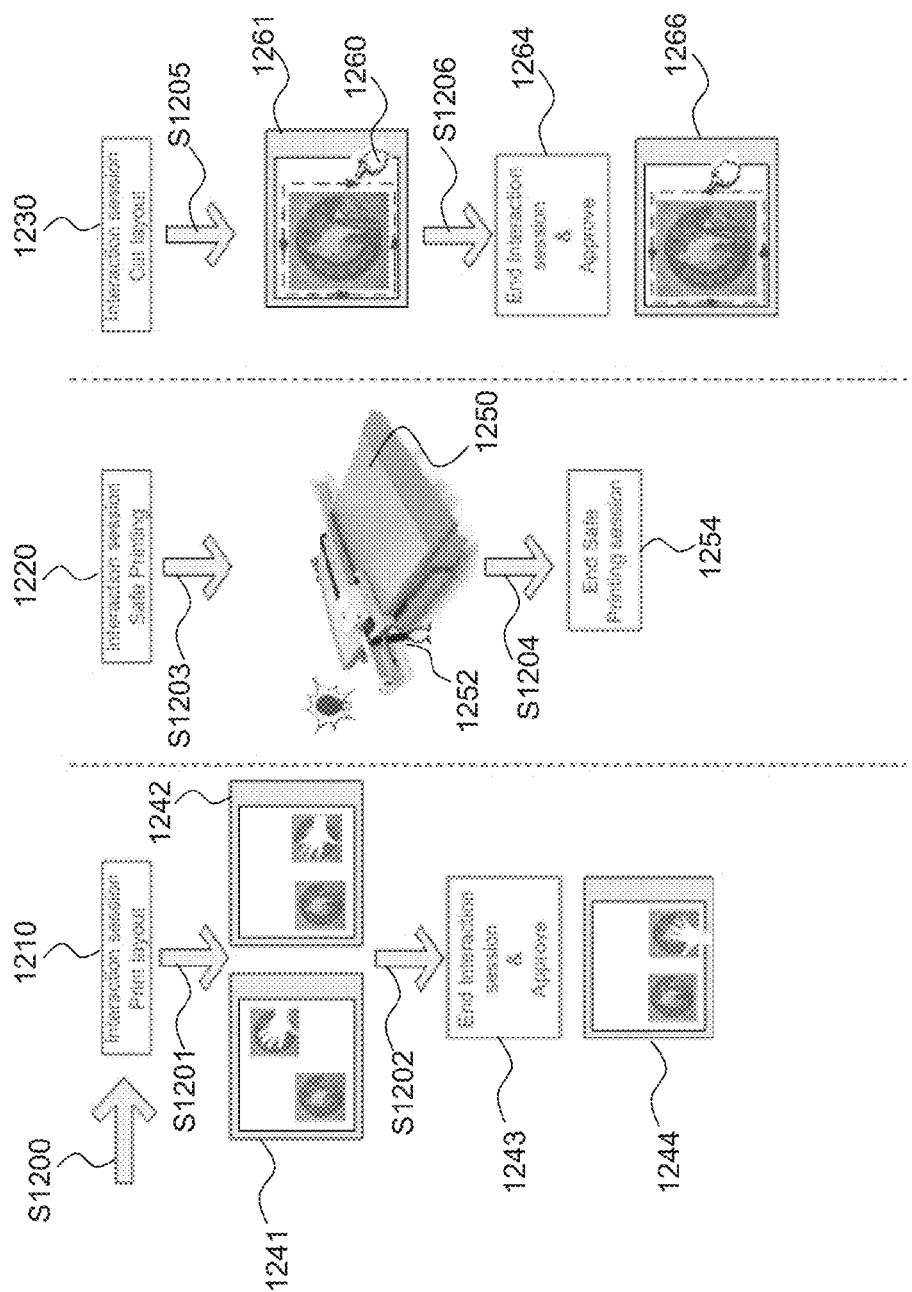
FIG. 12 is a schematic diagram of an embodiment of the method according to the present invention, including operating the printer system with safe sessions.

An example of the embodiment is shown in FIG. 12. In a first step S1200, a menu of sessions is displayed at the user interface of the computer system connected to the camera/video system via a network. The menu may comprise a plurality of interaction sessions like a first interaction session 1210 to configure the print layout, a second interaction session 1220 for safe printing, or a third interaction session 1230 for configuring a cut layout.

In the first session 1210, in a first step S1201, all hand positions and movements are detected and transposed to actions for changing the print layout. For example, a hand movement from a position on the flatbed surface as in captured image 1241 to a position on the flatbed surface as in captured image 1242 is detected in a step S1202, and results in an adaptation of the projected image. In a third step 1243, the first session is ended and the changes are saved. After the end 1243 of the session, all hand movements are ignored and the operator can safely touch the media on the flatbed surface without changing the layout as shown in image 1244.

In the second session 1220, in a first step 1203, intrusions in the working zone around and on the flatbed surface 1250 are detected, for example the appearance of a human being 1252 near the flatbed surface 1250. In a second step S1204, appropriate actions are invoked, for example displaying a warning on the user interface of the computer system, displaying a warning on a mobile device of a responsible operator or submitting a local alert like a beep. The second session 1220 is in particular useful while printing is going on upon media on the flatbed surface by the printer system. In a third step 1254, the second session is ended and the operator can freely interact with the flatbed surface, for example because the printing has ended.

In the third session 1230, in a first step S1205, all hand positions and movements are detected and transposed to actions for changing the cut layout. For example, a hand movement 1260 at the projection of the cut path to a position on the flatbed surface as in captured image 1261 is detected in a step S1206 and results in an adaptation of the position or direction of the cut path in the projected image. In a third step 1264, the third session is ended and the changes are saved. After the end 1264 of the session, all hand movements are ignored and the operator can safely touch the media on the flatbed surface without changing the cut path, as shown in image 1266.

According to an embodiment, the method comprises the further step of checking a quality of an on-going production of the printing of the digital image, by comparing an image of the work in progress captured by the camera-projector system with the digital image. The camera-projector system is used to automatically check the quality of the on-going production of the printing of an image, by comparing an image of the work in progress captured by the camera with the input digital image. Check points may be about print quality such as failing nozzles or a failing print head, banding artefacts, out of recording material situation, or areas spoiled by, e.g. dust. Quality criteria are used to decide on the action to be taken when a difference is detected: continue production with or without alert, or stop production without manual intervention. This embodiment may also be applied for a finishing device equipped with a camera-projector system. The captured image of the work in progress is compared with the input cut files. Check points can be about cut quality such as cut shape not according to expectations, media damaged or broken by the cut contour process, etc.

Figure 13:
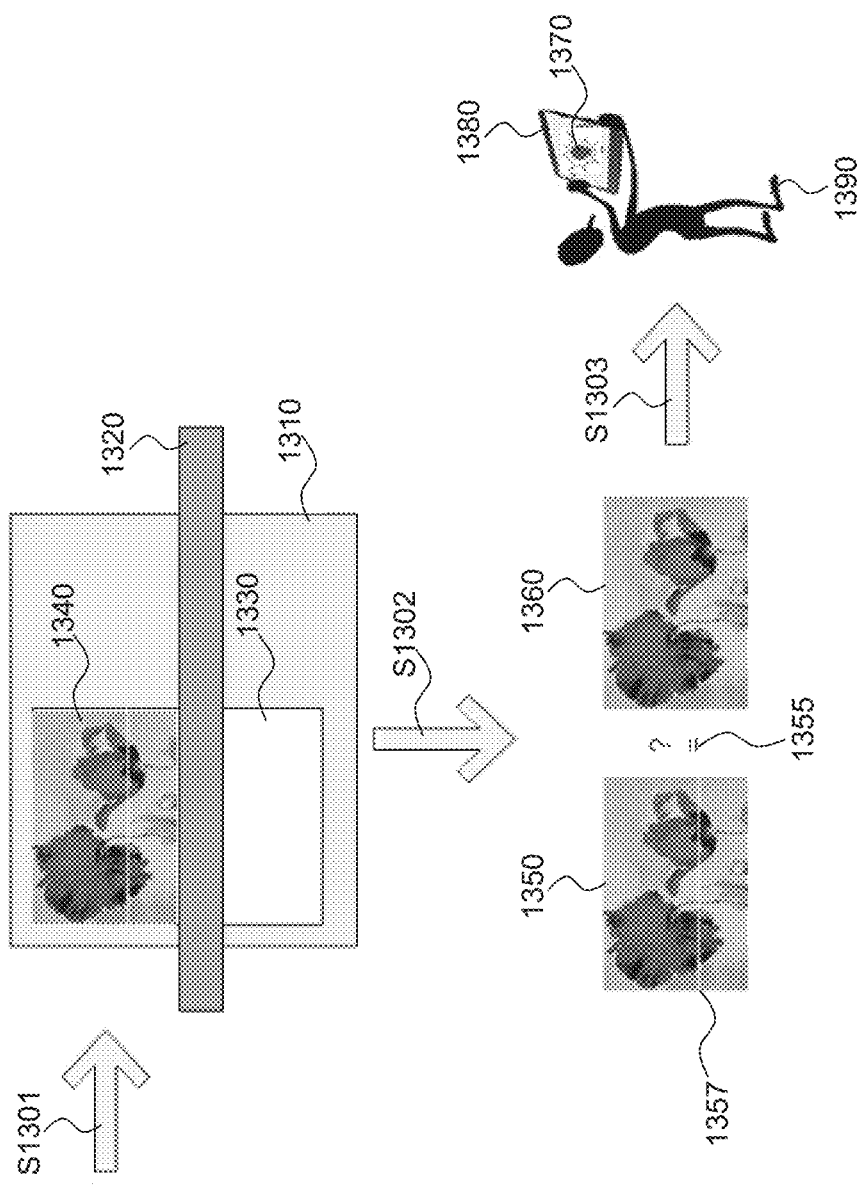
FIG. 13 is a schematic diagram of an embodiment of the method according to the present invention, including automatic checking of a print quality.

FIG. 13 illustrates an example of the embodiment. In a first step S1301, the camera takes pictures of the printed part 1340 on the piece of media on the flatbed surface 1310. The gantry 1320 has passed the printed part 1340 and is busy with printing of the unprinted part 1330 of the piece of media. In a second step S1302, the detected information from the pictures, like image 1350 is compared in a comparison 1355 to the original image 1360. A banding artifact 1357 is discovered. In a third step S1303, the information 1370 of the banding artifact is displayed on the user interface of the computing system or sent to a mobile device 1380 of an operator 1390 and displayed on the mobile device 1380.

According to an embodiment, the method further comprises the steps of fixing the piece of media with suction holes in the flatbed surface, detecting suction holes on which no media is placed with the camera-projector system and deactivating the detected suction holes. In this embodiment, the suction holes are individually controlled by the printer controller or controlled in partial areas of the flatbed surface.

In a further embodiment, the method further comprises a step of activating suction holes that are covered by the piece of media.

In an alternative embodiment, the method comprises the steps of fixing the piece of media with suction holes in the flatbed surface, detecting suction holes on which media is placed with the camera-projector system, deriving suction holes on which no media is placed and deactivating the derived suction holes.

Figure 14:
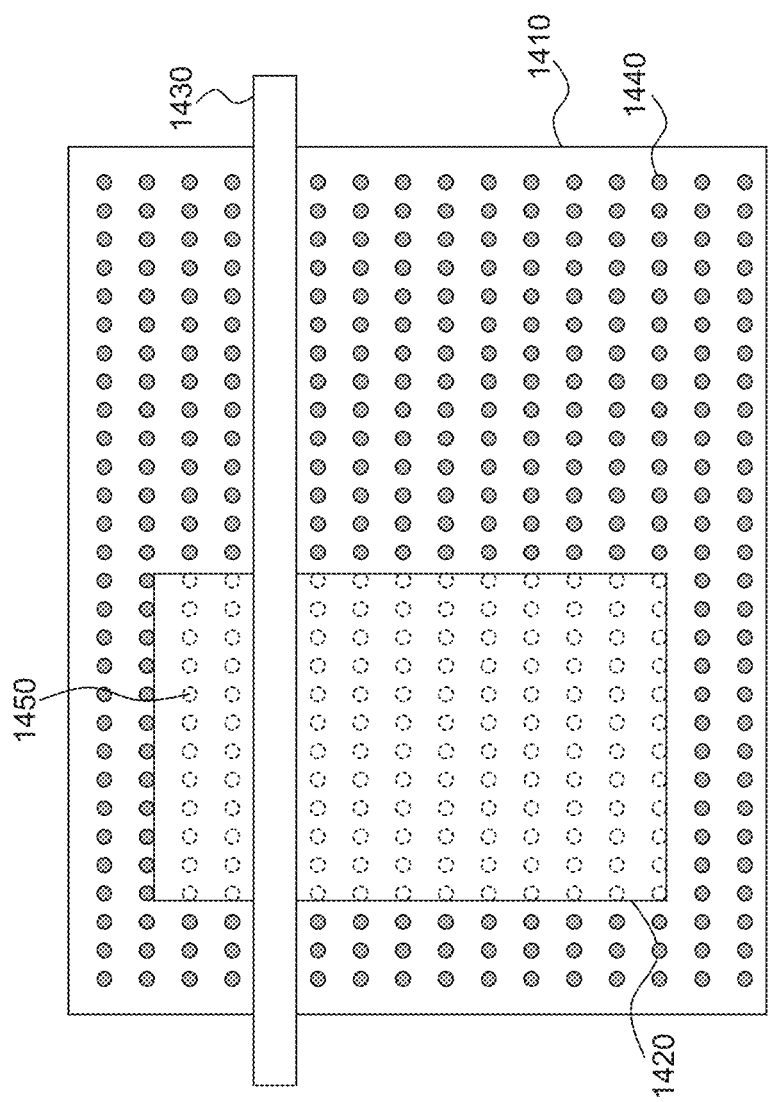
FIG. 14 is a schematic diagram of an embodiment of the method according to the present invention, including automatic fixing of an original media on the flatbed surface.

An example of the embodiment is shown in FIG. 14. A piece of media 1420 is placed on the flatbed surface 1410. The flatbed surface 1410 comprises suction holes 1440, 1450 for sucking air in order to fix pieces of media placed on the flatbed surface 1410, while printing on the pieces of media by moving a gantry 1430 over the flatbed surface 1410. The piece of media 1420 covers some of the suction holes 1450, while other suction holes 1450 are not covered by the piece of media 1420. In a first step, the camera detects all suction holes 1440, 1450 in the flatbed surface 1410. In a second step, the piece of media 1420 is placed on the flatbed surface 1410. The camera detects the suction holes 1440 that are not covered by the piece of media 1420. The suction holes 1440 that are not covered by the piece of media 1420 are deactivated. According to the further embodiment, the computer system derives the suction holes 1450 that are covered by the piece of media 1420. The printer controller activates the suction holes 1450 that are covered by the piece of media 1420, if not yet activated.

In a further embodiment, the method comprises the step of projecting segments of the suction holes on the flatbed surface. Suction holes in the flatbed surface are organized into segments that are configured to be individually activated or de-activated. By displaying the segments on the flatbed surface, the operator is supported in smart positioning of the piece of media on the flatbed surface. For example, the piece of media may cover only one segment or a part of one segment. In case of the piece of media covering a part of one segment, the remaining part of the segment, which part is not covered by the piece of media, may be covered manually by the operator. This remaining part may as well be projected on the flatbed surface with, for example a distinguishing color. The operator may align the piece of media with the borders of the segments of the suction holes in order to reduce the effort of this manual action. Misalignment information may be given as feedback via the user interface of the printing system.

In an embodiment, the method comprises a step of projecting a grid of vertical and horizontal lines on the flatbed surface. When a piece of media is detected on the flatbed surface, a misalignment of the piece of media with the grid may be detected and feedback via the user interface of the print system is given to the operator. The grid may be configurable by the printing system, for example the grid may be adapted to the sizes of the pieces of media expected to be printed or to a grid that is already formed by the suction holes or the segments of the suction holes. The grid may be helpful to the operator for aligning a piece of media with at least one direction of the lines of the projected grid.

According to an embodiment, the method further comprises the steps of determining at least one position on the piece of media detected by the camera-projector system, measuring the media elevation at the determined at least one position with a sensor near the print head, and using a maximum measured elevation for automatically configuring a media thickness. For not-flat media, the user has to find out which part of the piece of media is the thickest. With this embodiment, the user does not need to measure anything anymore. The thickness may also be determined with two cameras of the camera-projector system or with one camera and one projector of the camera-projector system.

Figure 15:
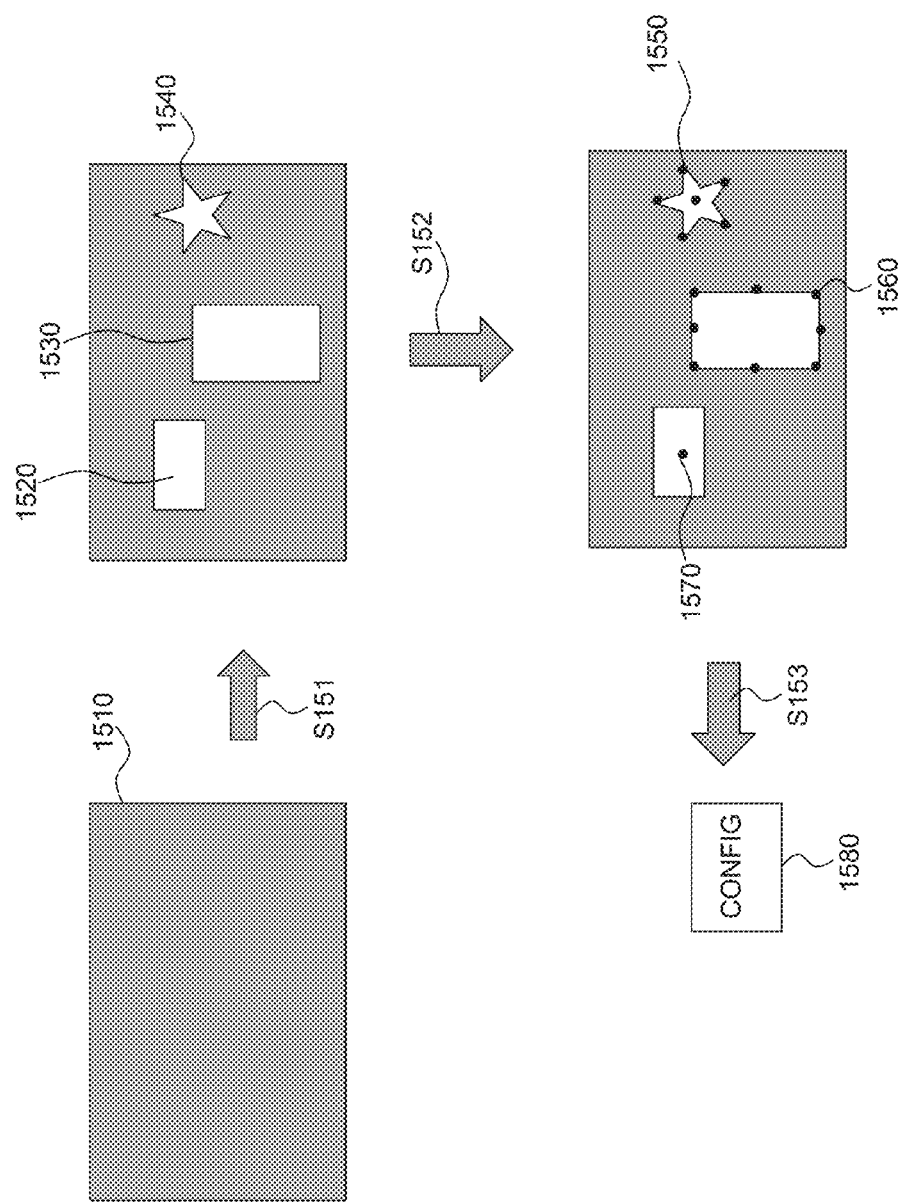
FIG. 15 is a schematic diagram of an embodiment of the method according to the present invention, including automatic media thickness detection.

An example of the embodiment is shown in FIG. 15. In a first step S151, three pieces 1520, 1530, 1540 of media are placed on the flatbed surface 1510.

In a second step, shapes of the pieces 1520, 1530, 1540 of media are detected by the camera-projector system. The computer system uses the video/photo system attached to the network or a computing system to acquire videos or photos of the flatbed surface of the printing system. The system detects the media shape and position directly from the video/photo streaming by using image processing algorithms like segmentation or statistics. Optionally, a low-precision elevation model of the media shapes may also be generated by processing the photo/video stream. The low-precision elevation model may then be used in the next step for selecting measurement points only in the highest parts of the pieces of media.

In a third step S152, the computer system defines one or several points 1550, 1560, 1570 on the detected media pieces where the elevation must be measured. A number of methods may be considered for defining the points of measurements on a given piece of media. For example, measurements may be executed at the center of the media piece (1570), at a corner of the media piece (1560), at a random point on the media piece, at a series of points along each side of the media piece (1560), at a series of points along each diagonal of the media piece, at a combination of any number of the points mentioned here-before (1550), and at some position relative to the media, predefined by the operator.

In a fourth step S153, the system uses the sensor at the print head to measure the media elevation at the defined points 1550, 1560, 1570. The print head is moved in order to let the sensor reach the defined points 1550, 1560, 1570 in order to conduct the measurements by the sensor. Optionally, an entire area of the piece of media may be selected for measurement by the sensor. The system will then measure the elevation at all addressable positions of the area of the piece of media and build a high-precision elevation model of the piece of media. The high-precision elevation model may be used in the next step by the printer controller to get an optimal print quality on an entire surface of a non-flat media. In a variant, measurements of only a fraction of the addressable positions of the media area are selected.

In a fifth step 1580, the system uses a maximum elevation in order to automatically configure the media thickness. However, the printer controller may also be configured to use a different media thickness for each area 1520, 1530, 1540 covered by a piece of media on the flatbed surface 1510. In that way an optimal print quality can be achieved for all media pieces 1520, 1530, 1540, even if they are of different thickness.

The present invention also relates to a method for printing with a flatbed printer, the printer comprising a flatbed surface for placing a piece of media to be printed upon, a controller configured to control the printing of a digital image on the piece of media, a print head for ejecting recording material on the piece of media, and a camera system connected to the controller, the method comprising the steps of detecting the piece of media on the flatbed surface with a camera system, and printing the digital image on the detected piece of media by moving the print head over the flatbed surface and ejecting the recording material on the piece of media.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for printing with a flatbed printer, the flatbed printer comprising a flatbed surface for placing a piece of media to be printed upon, a controller configured to control the printing of a digital image on the piece of media, a print head for ejecting recording material on the piece of media, and a camera-projector system comprising a camera system connected to the controller, and a projector system, wherein both the projector system and the camera system have a reach of at least the entire flatbed surface, the method comprising the steps of:

detecting the piece of media on the flatbed surface with the camera system;

deriving a position and a size of the detected piece of media on the flatbed surface;

projecting the digital image towards the flatbed surface with the projector system in order to present to an operator a location on the piece of media, at which location the digital image is intended to be printed on the piece of media; and printing the digital image on the detected piece of media at the location of the projected digital image by moving the print head over the flatbed surface relative to the camera-projector system and ejecting the recording material on the piece of media.

2. The method according to claim 1, further comprising the steps of:

detecting gestures at the projected digital image with the camera-projector system;

adjusting the digital image with the controller unit according to the gestures; and projecting the adjusted digital image with the projector system on the piece of media on the flatbed surface.

3. The method according to claim 1, wherein the step of detecting the piece of media further comprises the steps of:

composing another digital image comprising the contours of the detected piece of media; and projecting said another digital image on the flatbed surface with the camera-projector system to indicate that the piece of media has been detected.

4. The method according to claim 1, further comprising the step of projecting a cut path on the piece of media, said cut path circumscribing the projected image on the piece of media.

5. The method according to claim 4, wherein the cut path is changeable with gestures registered by the camera-projector system.

6. The method according to claim 1, further comprising the steps of:

detecting non-printable areas of the piece of media with the camera-projector system; and prohibiting the ejection of recording material on the non-printable areas.

7. The method according to claim 1, further comprising the steps of:

detecting a position of an operator at the flatbed surface with the camera-projector system;

projecting a menu of functions available for an operator on the flatbed surface near the detected position of the operator at the flatbed surface;

detecting gestures of the operator at the menu; and
activating a function indicated by the detected gesture at the menu.

8. The method according to claim 7, further comprising the steps of:
detecting a change in the position of the operator at the flatbed surface; and
projecting the menu near the changed position of the operator.

9. The method according to claim 1, further comprising the steps of:
fixing the piece of media with suction holes in the flatbed surface;
detecting suction holes on which no media is placed with the camera-projector system; and
deactivating the detected suction holes.

10. The method according to claim 1, further comprising the steps of:
determining at least one position on the piece of media detected by the camera-projector system;
measuring the media elevation at the determined at least one position with a sensor near the print head; and
using a maximum measured elevation for automatically configuring the media thickness.

11. A non-transitory recording medium comprising computer executable program code configured to instruct a computer to perform the method according to claim 1.

12. A flatbed printer comprising:
a flatbed surface for placing media to be printed upon;
a controller configured to control the printing of digital images;
a print head for ejecting recording material on the media, the print head being movable over the flatbed surface; and
a camera-projector system connected to the controller and comprising a camera system for capturing images from the flatbed surface, and a projector system for projecting digital images towards the flatbed surface, wherein the projector system and the camera system have a reach of at least the entire flatbed surface,
wherein the controller comprises:
a first image processor configured to detect a piece of media positioned on the flatbed surface with the camera-projector system; and
a second image processor configured to adapt the digital image to be printed in order to fit the digital image on the detected media,
wherein the projector system is configured to project the digital image at the detected position on the media, and
wherein the controller controls the print head to move relative to the camera-projector system in order to print the digital image on the piece of media according to a position of the piece of media on the flatbed surface and according to the projected digital image.

13. The flatbed printer according to claim 12, wherein the controller further comprises a gesture detector configured to detect gestures at the projected digital image with the camera, the second image processor is configured to adjust the digital image according to the gestures, and the projector is configured to project the adjusted digital image on the media on the flatbed surface.

* * * * *